US008955451B2

(12) United States Patent
Daley et al.

(10) Patent No.: US 8,955,451 B2
(45) Date of Patent: Feb. 17, 2015

(54) FOIL STRUCTURE FOR PROVIDING BUOYANCY AND LIFT

(75) Inventors: Carl Daley, Elizabeth City, NC (US); Peter E. Jess, Calgary (CA)

(73) Assignee: Aeromarine Innovations Inc. (CA)

( * ) Notice: Subject to any disclaimer, the term of this patent is extended or adjusted under 35 U.S.C. 154(b) by 87 days.

(21) Appl. No.: 13/880,850

(22) PCT Filed: Jan. 16, 2012

(86) PCT No.: PCT/CA2012/000054
§ 371 (c)(1),
(2), (4) Date: May 15, 2013

(87) PCT Pub. No.: WO2012/097444
PCT Pub. Date: Jul. 26, 2012

(65) Prior Publication Data
US 2013/0255559 A1    Oct. 3, 2013

(30) Foreign Application Priority Data

Jan. 18, 2011    (CA) ..................................... 2728819

(51) Int. Cl.
*B63B 1/24* (2006.01)
*B63B 1/20* (2006.01)
*B63B 1/26* (2006.01)
*B64C 25/54* (2006.01)

(52) U.S. Cl.
CPC . *B63B 1/248* (2013.01); *B63B 1/20* (2013.01); *B63B 1/246* (2013.01); *B63B 1/26* (2013.01); *B64C 25/54* (2013.01); *B63B 2001/206* (2013.01)
USPC ............................ 114/274; 114/280; 114/278

(58) Field of Classification Search
USPC .......................................... 114/274, 278, 280
See application file for complete search history.

(56) References Cited

U.S. PATENT DOCUMENTS 3,307,511 A * 3/1967 Chapman ................... 114/61.21
4,996,935 A * 3/1991 Takeuchi ..................... 114/61.2
(Continued)

OTHER PUBLICATIONS

PCT, International Search Report, PCT/CA2012/000054 (mailed Apr. 20, 2012; published Jul. 26, 2012).

*Primary Examiner* — Lars A Olson
*Assistant Examiner* — Jovon Hayes
(74) *Attorney, Agent, or Firm* — Thompson Hine, L.L.P.

(57) ABSTRACT

A foil structure for providing buoyancy and lift to a floating device is provided. The foil structure comprises an elongated left hand side floating device section and an elongated right hand side floating device section. The left hand side floating device section and the right hand side floating device section are placed at a predetermined distance to a longitudinal axis of the floating device and oriented substantially parallel thereto. A left hand side foil and a right hand side foil protrudes from the left hand side floating device section and the right hand side floating device section, respectively, towards a vertical plane through the longitudinal axis and is oriented at an acute angle to a horizontal plane. A leading edge of each foil intersects the respective floating device section in proximity to a bow portion thereof. Each foil extends along the respective floating device section and terminates in proximity to a stern portion thereof. Each foil has a top surface with a front portion thereof being angled downward towards the leading edge. The angled front portion is determined such that wave penetration is assisted and instabilities due to buoyancy change are substantially dampened.

36 Claims, 30 Drawing Sheets

(56) References Cited

U.S. PATENT DOCUMENTS

| | | | | |
|---|---|---|---|---|
| 5,054,410 A | * | 10/1991 | Scarborough | 114/39.26 |
| 5,522,333 A | * | 6/1996 | Lang et al. | 114/61.12 |
| 6,065,415 A | * | 5/2000 | Orr | 114/61.1 |
| 6,499,419 B1 | * | 12/2002 | Bussard | 114/274 |
| 7,487,736 B2 | * | 2/2009 | Daley | 114/271 |
| 7,841,285 B2 | * | 11/2010 | Howes et al. | 114/140 |
| 2013/0255559 A1 | * | 10/2013 | Daley et al. | 114/278 |

\* cited by examiner

FOIL STRUCTURE FOR PROVIDING BUOYANCY AND LIFT

This application is the national stage filing of PCT International Application No. PCT/CA2012/000054, which in turn claims priority to Canadian Application No. 2,728,819, filed on Jan. 18, 2011. The entire contents of both of these applications are incorporated herein by reference.

FIELD OF THE INVENTION

The present invention relates to the field of floating devices capable of floating on a water surface, and more particularly to a foil structure for providing buoyancy and lift to the floating devices.

BACKGROUND OF THE INVENTION

Generally, the hull designs of present day watercraft have the disadvantage of relatively slow speed when operating in rough water or swell due to either substantial water resistance from large wetted areas or slamming effects of large waves. This also results in low efficiency and high fuel consumption.

To increase speed and efficiency, various types of hull designs have been developed such as, for example, hydrofoils and water piercing high speed catamarans. Both of these designs raise the main body of the vessel up out of the water to decrease water resistance in rough water and provide shock mitigation caused by slamming waves.

Unfortunately, each of these design concepts have inherent, unfavourable behavioural characteristics. The hydrofoils suffer from cavitation problems affecting maximum speeds and require complex control and drive systems with associated maintenance issues. Surface piercing catamarans have large wetted areas, also limiting maximum speed and suffer from instabilities in pitch in rough water and swells.

U.S. Pat. No. 7,487,736 discloses a hybrid boat hull that comprises two elongated hulls which are curved inwards forming two keel foils. The keel foils provide water displacement when submerged, act in a similar manner to a hydrofoil when piercing through waves and swell and provide a planing capability on the water surface at higher speeds.

It s desirable to provide a foil structure for providing buoyancy and lift to a floating device that has increased stability when encountering waves and when travelling at high speed.

It is also desirable to provide a foil structure for providing buoyancy and lift to a floating device that has increased efficiency.

It is also desirable to provide a foil structure for providing buoyancy and lift to a floating device that is implemented as a retrofit to an existing watercraft.

SUMMARY OF THE INVENTION

Accordingly, one object of the present invention is to provide a foil structure for providing buoyancy and lift to a floating device that has increased stability when encountering waves and when travelling at high speed.

Another object of the present invention is to provide a foil structure for providing buoyancy and lift to a floating device that has increased efficiency.

Another object of the present invention is to provide a foil structure for providing buoyancy and lift to a floating device that is implemented as a retrofit to an existing watercraft.

According to one aspect of the present invention, there is provided a foil structure for providing buoyancy and lift to a floating device. The foil structure comprises an elongated left hand side floating device section and an elongated right hand side floating device section. The left hand side floating device section and the right hand side floating device section are placed at a predetermined distance to a longitudinal axis of the floating device and oriented substantially parallel thereto. A left hand side foil and a right hand side foil protrudes from the left hand side floating device section and the right hand side floating device section, respectively, towards a vertical plane through the longitudinal axis and is oriented at an acute angle to a horizontal plane. A leading edge of each foil intersects the respective floating device section in proximity to a bow portion thereof. Each foil extends along the respective floating device section and terminates in proximity to a stern portion thereof. Each foil has a top surface that is substantially flat at a rear portion and mid portion thereof and that is angled downward therefrom towards the leading edge with the angled surface portion being determined such that wave penetration is assisted and instabilities due to buoyancy change are substantially dampened.

According to the aspect of the present invention, there is further provided a foil structure for providing buoyancy and lift to a floating device. The foil structure comprises an elongated left hand side floating device section and an elongated right hand side floating device section. The left hand side floating device section and the right hand side floating device section are placed at a predetermined distance to a longitudinal axis of the floating device and oriented substantially parallel thereto. A left hand side foil and a right hand side foil protrudes from the left hand side floating device section and the right hand side floating device section, respectively, towards a vertical plane through the longitudinal axis and being oriented at an acute angle to a horizontal plane. A leading edge of each foil intersects the respective floating device section in proximity to a bow portion thereof and changes to a side edge extending along the respective floating device section and terminates in proximity to a stern portion thereof. A downward fin is disposed along at least a substantial portion of the side edge of the left hand side foil and the right hand side foil. The downward fin is oriented substantially downward.

According to another aspect of the present invention, there is provided a foil structure for providing buoyancy and lift to a watercraft. A hull connecting mechanism comprises a holding element for being mated with a respective portion of a hull of the watercraft and a mounting element for mounting the hull connecting mechanism to the watercraft in a secure fashion. An elongated left hand side hull section and an elongated right hand side hull section are connected to the hull connecting mechanism. The left hand side hull section and the right hand side hull section are placed at a predetermined distance to a longitudinal axis of the watercraft and oriented substantially parallel thereto. A left hand side foil and a right hand side foil protrude from the left hand side hull section and the right hand side hull section, respectively, towards a vertical plane through the longitudinal axis and are oriented at an acute angle to a horizontal plane. A leading edge of each foil intersects the respective hull section in proximity to a bow portion thereof. Each foil extends along the respective hull section and terminates in proximity to a stern portion thereof.

An advantage of the present invention is that it provides a foil structure for providing buoyancy and lift to a floating device that has increased stability when encountering waves and when travelling at high speed.

A further advantage of the present invention is that it provides a foil structure for providing buoyancy and lift to a floating device that has increased efficiency.

A further advantage of the present invention is that it provides a foil structure for providing buoyancy and lift to a floating device that is implemented as a retrofit to an existing watercraft.

BRIEF DESCRIPTION OF THE DRAWINGS

A preferred embodiment of the present invention is described below with reference to the accompanying drawings, in which.

DETAILED DESCRIPTION

Figure 1A:
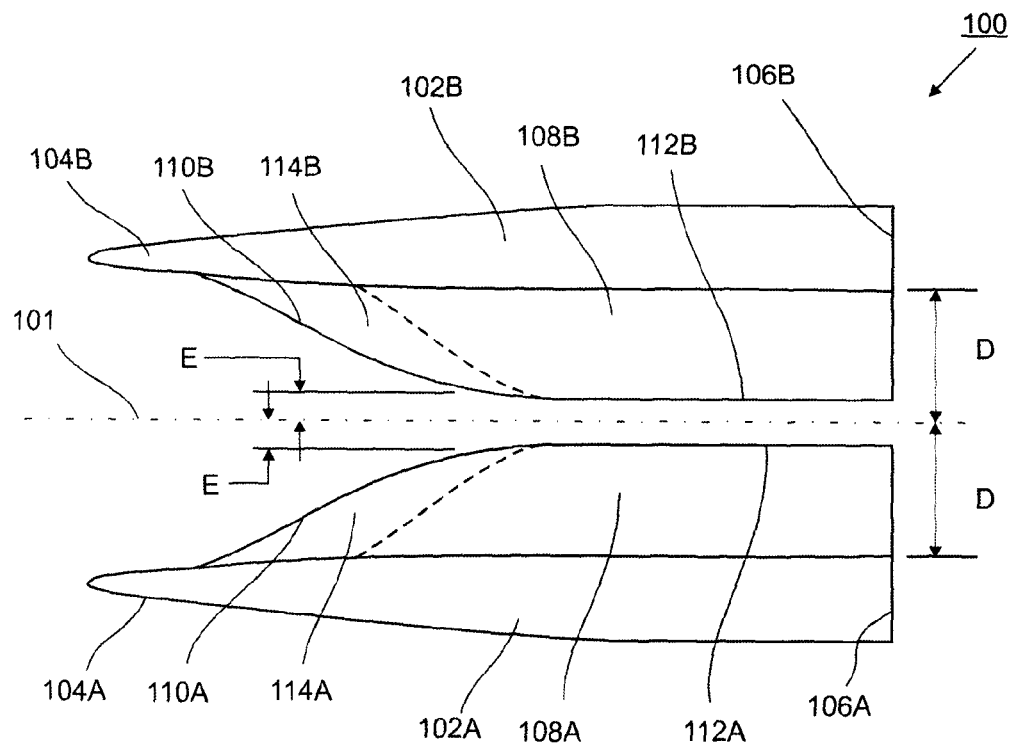
FIGS. 1a to 1c are simplified block diagrams illustrating a top view, a bottom view, and a front view, respectively, of a foil structure according to a first preferred embodiment of the invention.
Figure 1B:
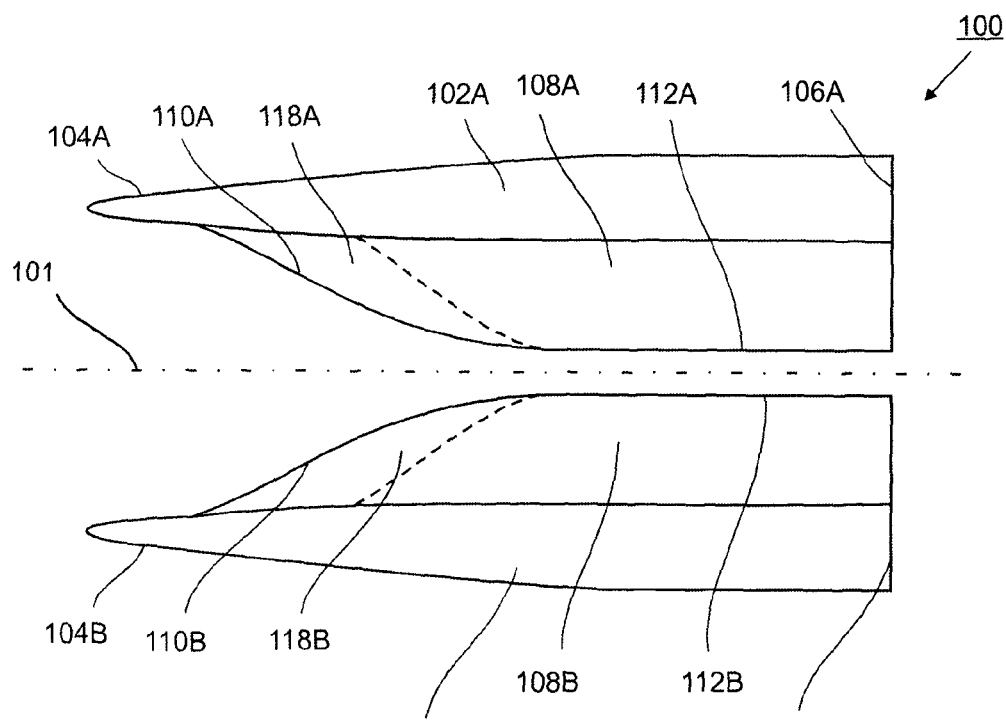

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

While embodiments of the invention will be described for small watercraft such as, for example, a personal watercraft or Sea-Doo®, it will become evident to those skilled in the art that the embodiments of the invention are not limited thereto, but are also applicable for various other types of watercraft of various sizes. Furthermore, the expression "floating device" is to be understood as a device capable of floating on a water surface and includes devices such as various types of watercraft, pontoons, float planes, amphibious aircraft, and seaplanes.

Referring to FIGS. 1a to 1d, a foil structure 100 for providing buoyancy and lift to a floating device in the form of a watercraft according to a first preferred embodiment of the invention is provided. The foil structure 100 according to a preferred embodiment of the invention comprises an elongated left hand side hull section 102A and an elongated right hand side hull section 102B. The left hand side hull section 102A and the right hand side hull section 102B are placed at a predetermined distance D to a longitudinal axis 101 of the watercraft and oriented substantially parallel thereto. A left hand side foil 108A and a right hand side foil 108B are protruding from the left hand side hull section 102A and the right hand side hull section 102B, respectively, towards a vertical plane 120 through the longitudinal axis 101. The left hand side foil 108A and the right hand side foil 108B are oriented at an acute angle α to a horizontal plane 122 with a being, preferably, in the range of approximately 5° to 60° and most preferably in the range of approximately 20° to 25°. A leading edge 110A, 110B of each foil 108A, 108B intersects the respective hull section 102A, 102B in proximity to a bow portion 104A, 104B thereof and changes into a side edge 112A, 112B oriented substantially parallel to the longitudinal axis 101 and placed a predetermined distance E thereto. Each foil 108A, 108B extends along the respective hull section 102A, 102B and terminates in proximity to a stern portion 106A, 106B thereof.

Preferably, the foils 108A, 108B are designed to provide additional buoyancy at a low speed of the watercraft. For travel at a higher speed—such as, for example, the designed range of cruise speed of the watercraft—a bottom surface of the foils 108A, 108B is shaped such that the foils 108A, 108B provide lift and, preferably, plane on the water surface, thus substantially reducing water resistance. Preferably, the bottom surface of each foil 108A, 108B is substantially flat at a rear portion and mid portion thereof—or, alternatively, slightly convex curved—and is angled upward therefrom at a front portion 118A, 118B towards the leading edge 110A, 110B to assist planing of the respective foil 108A, 108B. Further preferably, an extension of the angled surface portion 118A, 118B from the leading edge 110A, 110B increases with decreasing distance to the respective hull section 102A, 102B. The angled surface portion is determined dependent on factors such as, for example: the size of the foils 108A, 108B; the thickness of the foils 108A, 108B; and the designed range of speed of the watercraft. The determination is performed, for example, using standard empirical methods and/or using standard methods of computational fluid dynamics.

Each foil 108A, 108B has a top surface that is substantially flat at a rear portion and mid portion thereof—or, alternatively, slightly convex curved—and is angled—angle γ—downward therefrom at a front portion 114A, 114B towards the leading edge 110A, 110B. The angled front portion 114A, 114B is determined such that penetration of a wave 130 is assisted and instabilities due to buoyancy change are substantially dampened. Preferably, an extension of the angled surface portion 114A, 114B from the leading edge 110A, 110B increases with decreasing distance to the respective hull section 102A, 102B. Further preferably, the bow portion 104A, 104B of the hull sections 102A, 102B are of a substantially narrow shape to allow better penetration of a wave and to reduce the tendency of the bow to rise due to buoyancy. The hull sections 102A, 102E are thicker or wider towards the mid section and the stern to provide sufficient buoyancy when the watercraft is at rest or travelling at slow speed. The foils 108A, 108B and the bow portions 104A, 104B of the hull sections 102A, 102B are designed such that bow water displacement provides for a rise of the bow in a controlled fashion. Furthermore, the weight of the water disposed on the top of the foils 102A, 102B dampens the rise of the bow assisting controlled movement of the same. The angled surface portion 114A, 114B is determined such, that pitch of the watercraft has substantially increased stability at high speed and when encountering waves. The determination is performed, for example, using standard empirical methods and/or using standard methods of computational fluid dynamics.

Figure 1C:
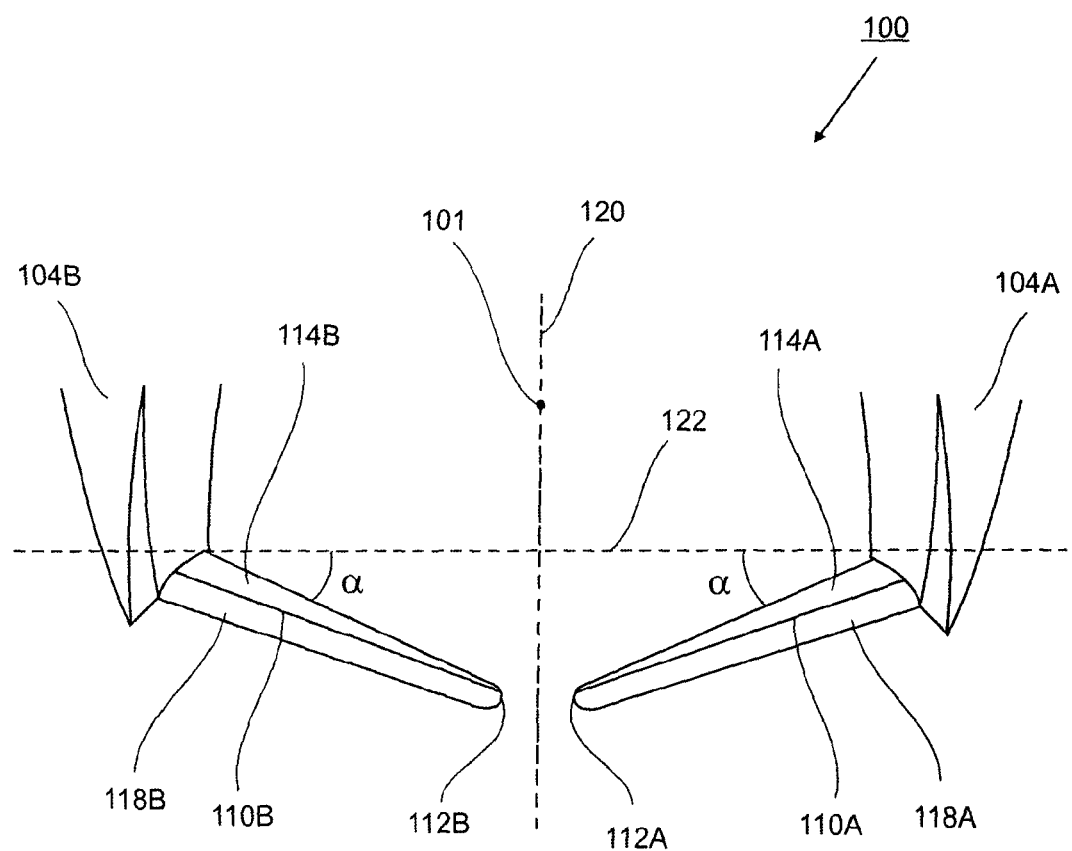
Figure 1D:
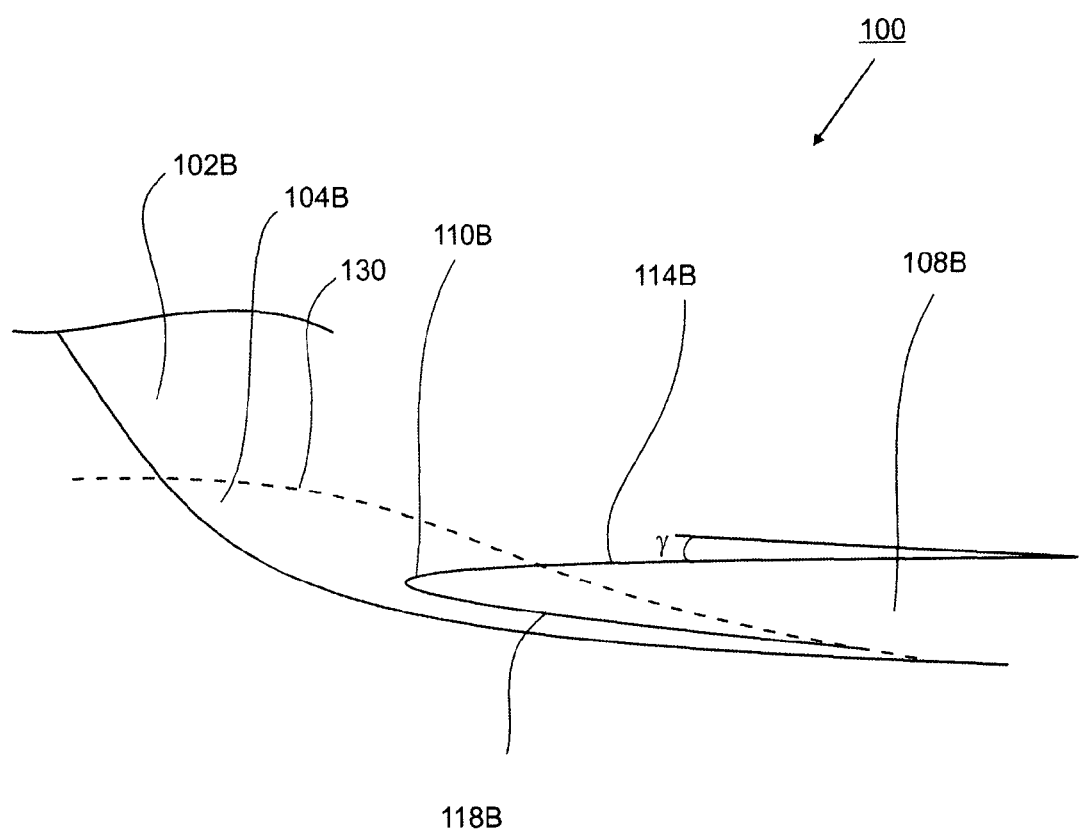
FIG. 1d is a simplified block diagram illustrating a side view of a hull section with foil of the foil structure illustrated in FIGS. 1a to 1c.

Preferably, the angled surface portions 114A, 114B, 118A, 118B are shaped, for example, forming substantially flat surfaces as illustrated in FIGS. 1c and 1d. Alternatively, the angled surface portions 114A, 114B, 118A, 118B are curved surfaces with, for example, increasing curvature towards the leading edge 110A, 110B.

Figure 2A:
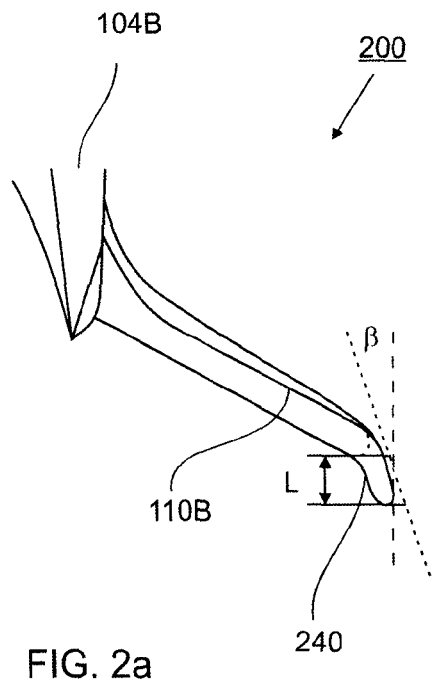
FIGS. 2a to 2c are simplified block diagrams illustrating a front view of a right hand side hull section with foil and fin according to another preferred embodiment of the invention.
Figure 2B:
Figure 2C:
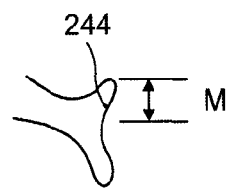
Figure 2D:
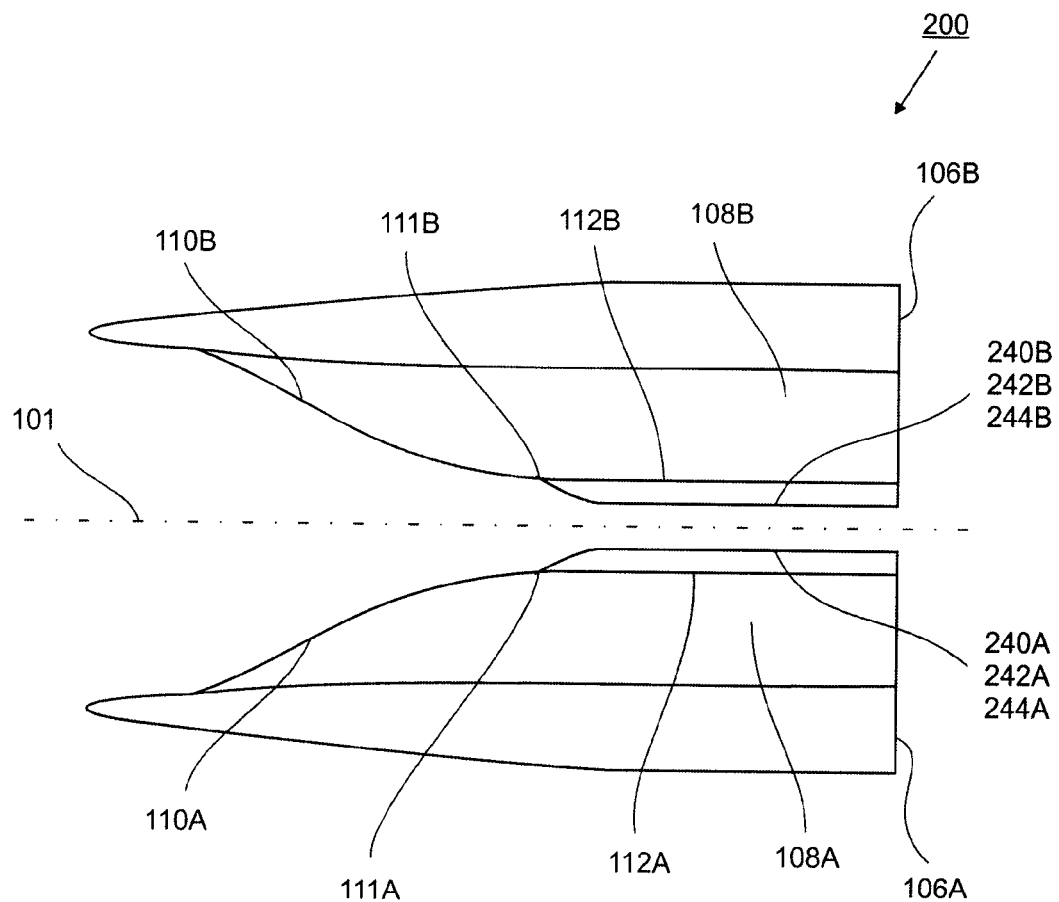
FIG. 2d is a simplified block diagram illustrating a bottom view of the foil structure illustrated in FIGS. 1a to 1c.

Referring to FIGS. 2a to 2d, a foil structure 200 for providing buoyancy and lift to a floating device in the form of a watercraft according to a second preferred embodiment of the invention is provided. The foil structure 200 comprises, a downward fin 240, 242 disposed along the side edge 112A, 112B of each of the foils 108A, 108B, respectively, as illustrated in FIGS. 2a to 2d. Preferably, the downward fin 240, 242 is disposed along the length of the side edge 112A, 112B from the location 111A, 111B—where the leading edge 110A, 110B changes into the side edge 112A, 112B—to the proximity of the stern portion 106A, 106B. Alternatively, the fin 240, 242 is of a different length extending along at least a substantial portion of the side edge 112A, 112B. The fin extends substantially downward from the side edge 112A, 112B a predetermined distance L, as illustrated in FIG. 2a. For example, the fin 140A, 140B is oriented at an acute angle β to a vertical plane—indicated by a dashed line. Alternatively, the fin 142A, 142B is oriented substantially parallel to the vertical plane. Optionally, an upward fin 244 is disposed along the side edge 112A, 112B of each of the foils 108A, 108B, respectively, with the upward fin 244 extending substantially upward therefrom a predetermined distance M, as illustrated in FIG. 2c.

The size, shape, and length of the fins are determined dependent on factors such as, for example: the size of the foils 108A, 108B; the thickness of the foils 108A, 108B; and the speed of the watercraft. The determination is performed, for example, using standard empirical methods and/or using standard methods of computational fluid dynamics. Provision of the fins increases the stability of the watercraft at high speed and increases efficiency in the form of higher speed and/or reduced fuel consumption.

As is evident to one skilled in the art, the fins according to the second preferred embodiment are easily combined with the foil structure according to the first embodiment having the angled front portion 114A, 114B of the top surface.

Optionally, one or more strakes are disposed on the upper surface and/or bottom surface of each of the foils 108A, 108B.

Figure 3A:
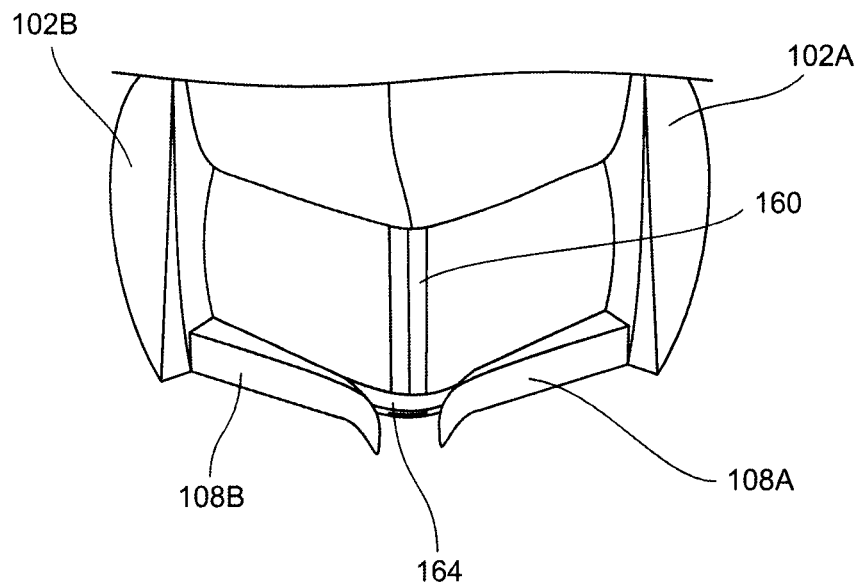
FIGS. 3a is to 3c are simplified block diagrams illustrating a front view, a detailed front view, and a perspective view, respectively, of a water intake mechanism according to a preferred embodiment of the invention.
Figure 3B:
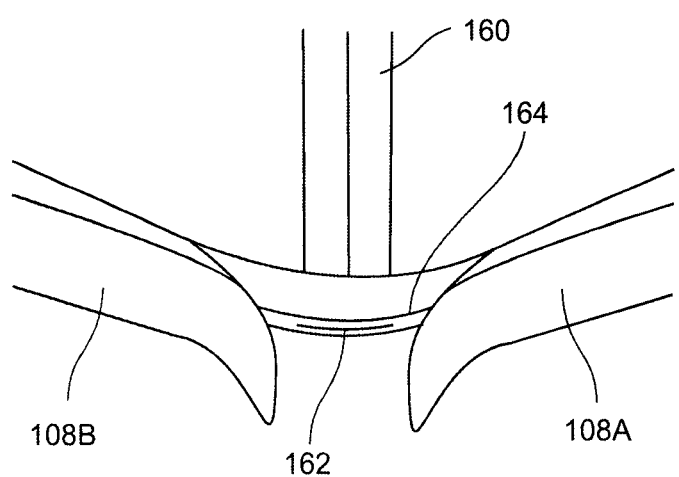
FIGS. 3d and 3e are simplified block diagrams illustrating a perspective front view and a perspective rear view, respectively, of another water intake mechanism according to a preferred embodiment of the invention.
Figure 3C:
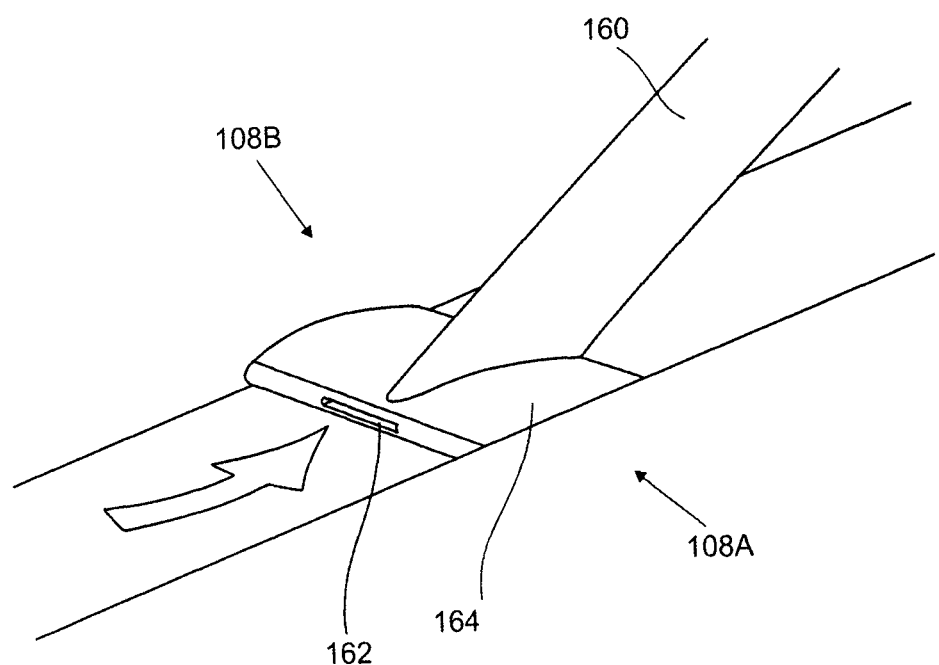

For watercraft comprising a water jet drive the foil structures 100, 200 preferably comprise a water intake mechanism for providing an intake water flow to a jet drive of the watercraft. For example, the water intake mechanism comprises an intake conduit 160 having an intake opening 162 disposed between the left hand side foil 108A and the right hand side foil 108B, as illustrated in FIGS. 3a to 3c. An end portion of the intake conduit 160 is securely connected to the left hand side foil 108A and the right hand side foil 108B. Preferably, the intake conduit 160 has a foil shape and is connected to the left hand side foil 108A and the right hand side foil 108B via intake foil structure 164 to reduce drag.

Figure 3D:
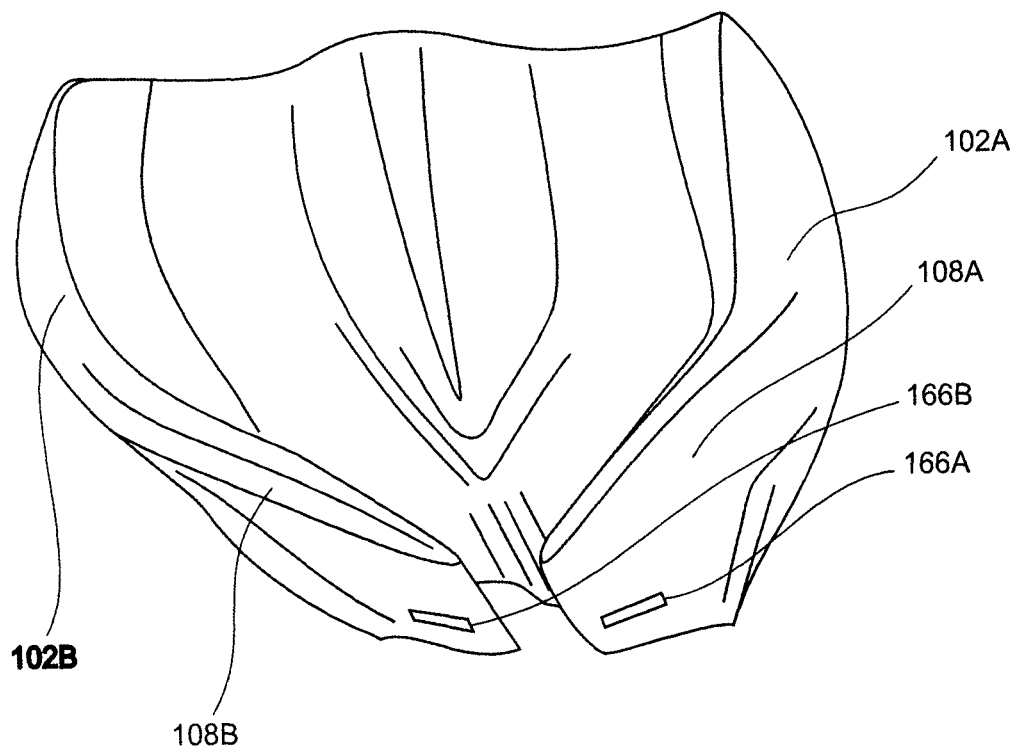
Figure 3E:
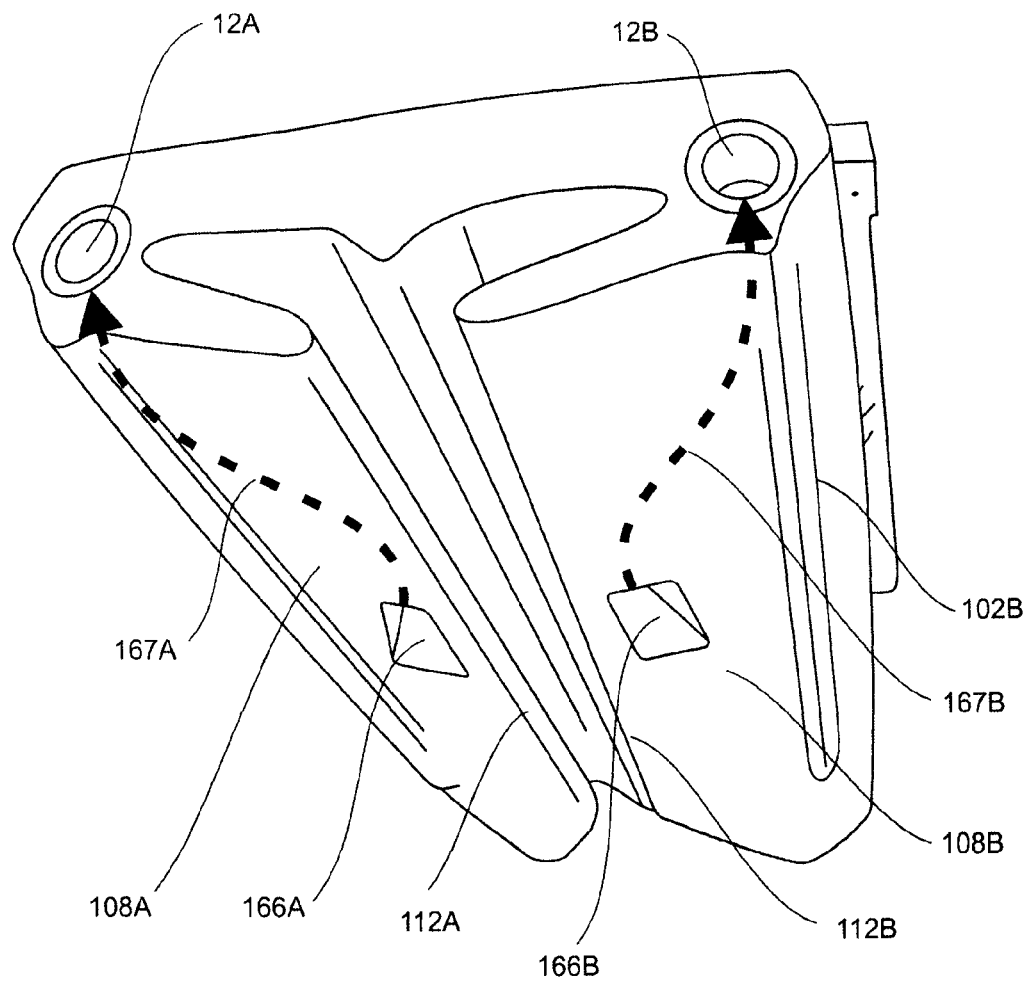

Alternatively, the water intake mechanism comprises a water intake conduit 167B disposed in at least one of the hull sections 102A, 102B and foils 108A, 108B and has a water intake opening 166A, 166B disposed in a bottom surface of the foil 108A, 108B, as illustrated in FIGS. 3d and 3e. The water intake openings 166A, 166B are disposed forward of the impellers 12A, 12B and placed in proximity to the side edge 112A, 112B of the foils 108A, 108B. Disposing the water intake openings 166A, 166B close to the side edge 112A, 112B of the foils 108A, 108B ensures that the intakes are not starved of water during a turning or cutting through waves. Preferably, the water intake conduits are gently curved between the water intake opening 166A, 166B and the respective impeller 12A, 12B to minimize friction losses.

Optionally, the water intake conduit 167B is provided such that water from the water intake openings 166A, 166B is fed to a single impeller placed at the center of the hull.

Further optionally, the foils 108A and 108B each comprise a hollow structure for use in dynamic ballasting of the watercraft which is implementable in a conventional manner.

Figure 4A:
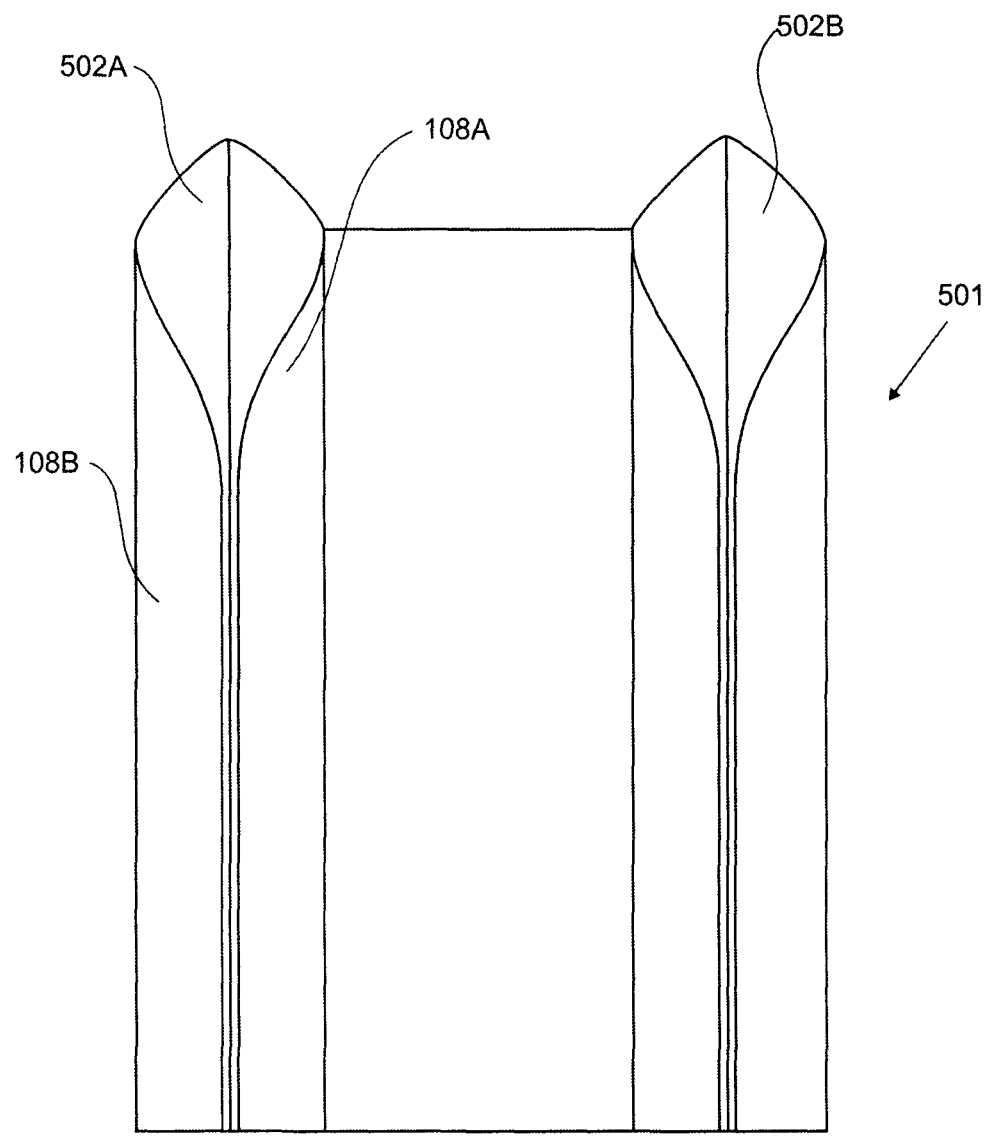
FIGS. 4a to 4c are simplified block diagrams illustrating a bottom view of a catamaran, a trimaran, and a catamaran with outrigger, respectively, incorporating an embodiment of the invention.
Figure 4B:
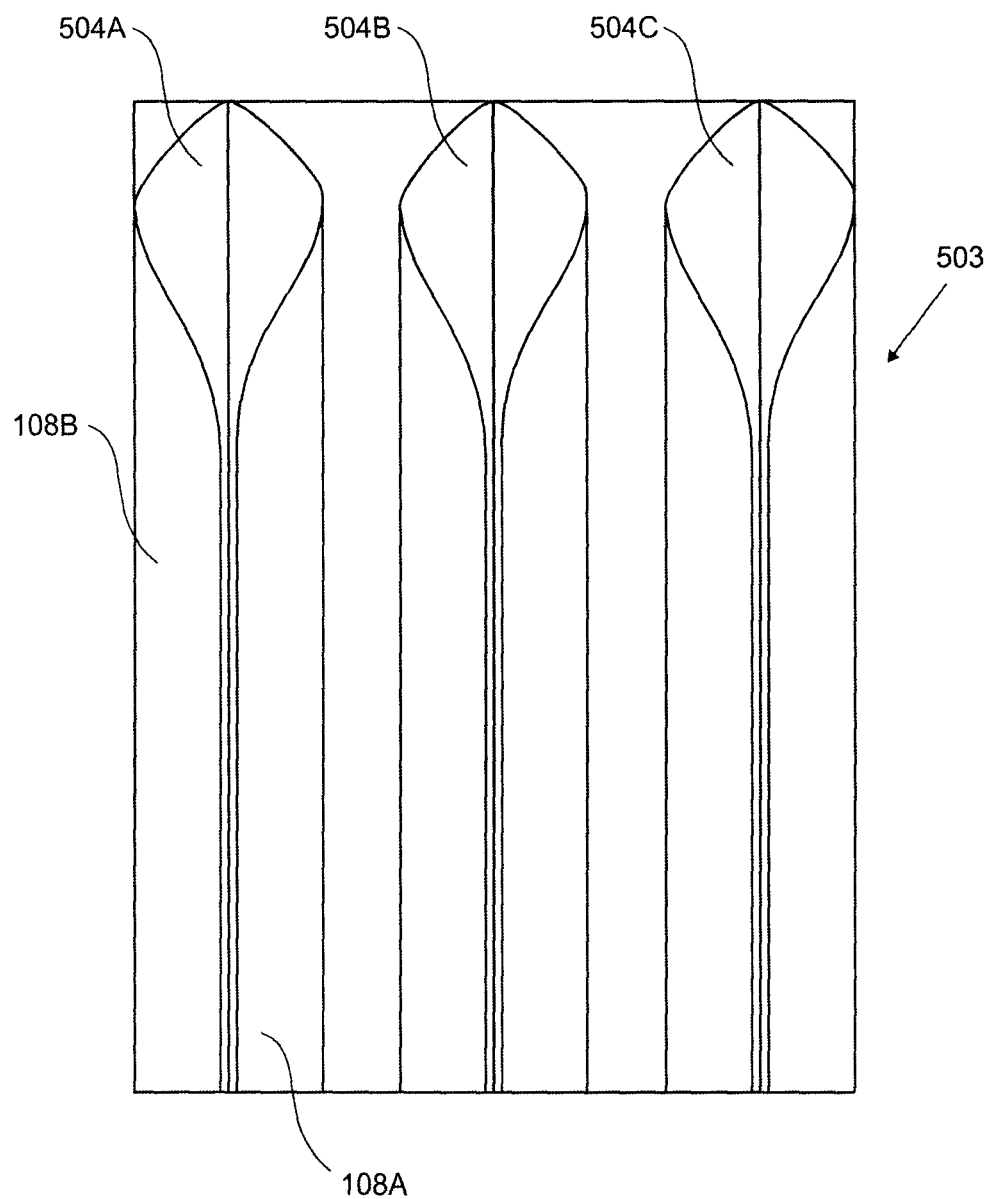
Figure 4C:
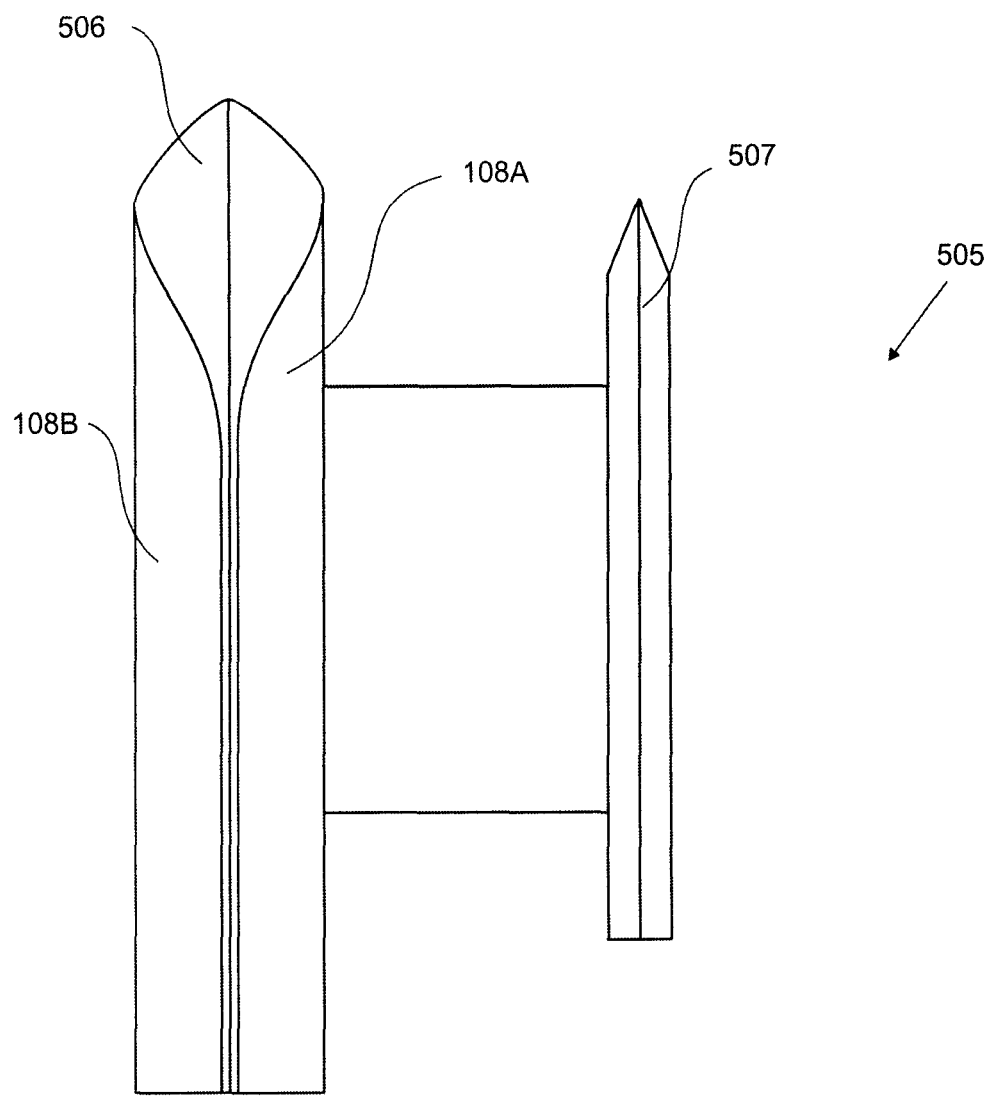
Figure 4D:
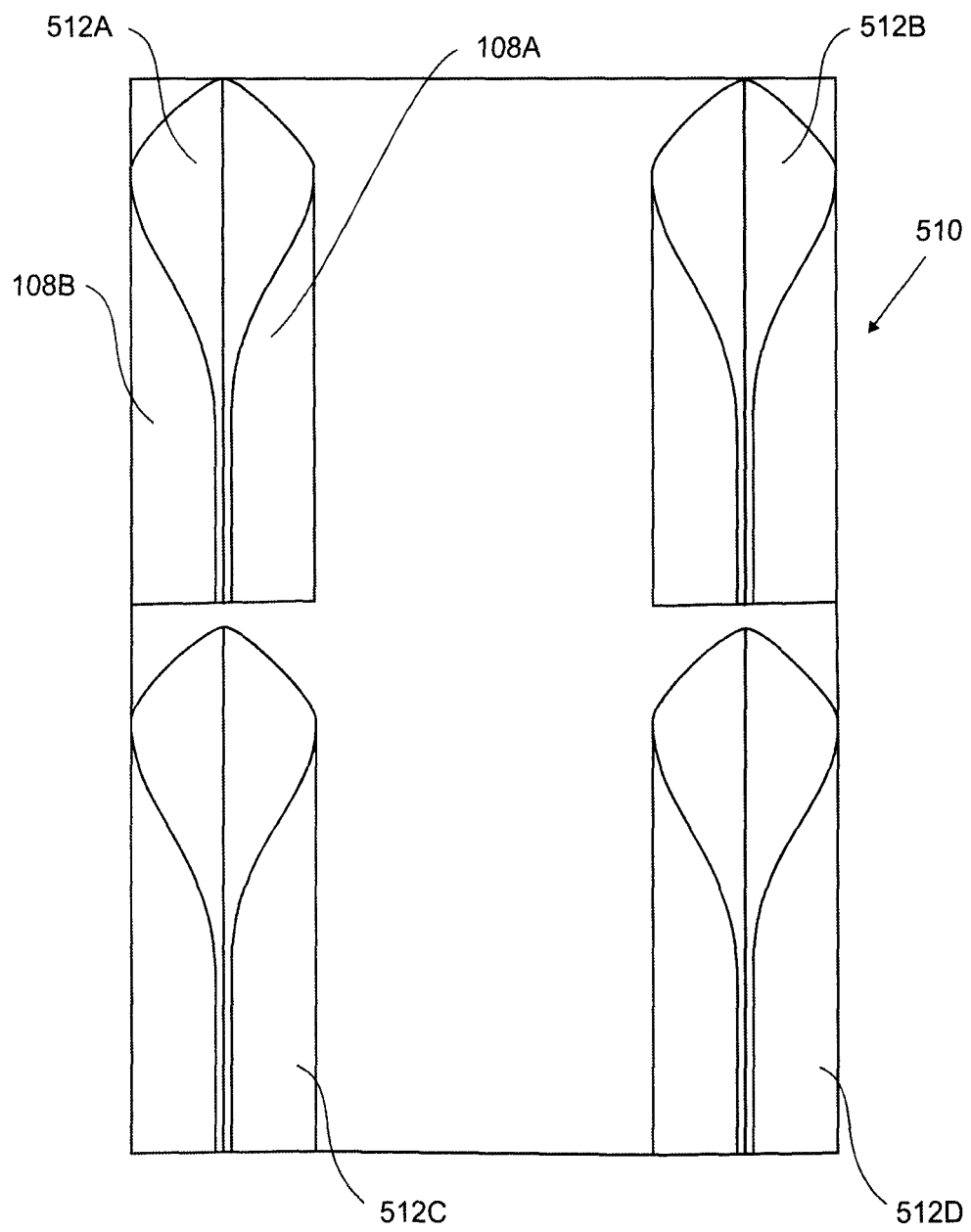
FIGS. 4d and 4e are simplified block diagrams illustrating a bottom view and a side view, respectively, of a pontoon boat incorporating an embodiment of the invention.
Figure 4E:
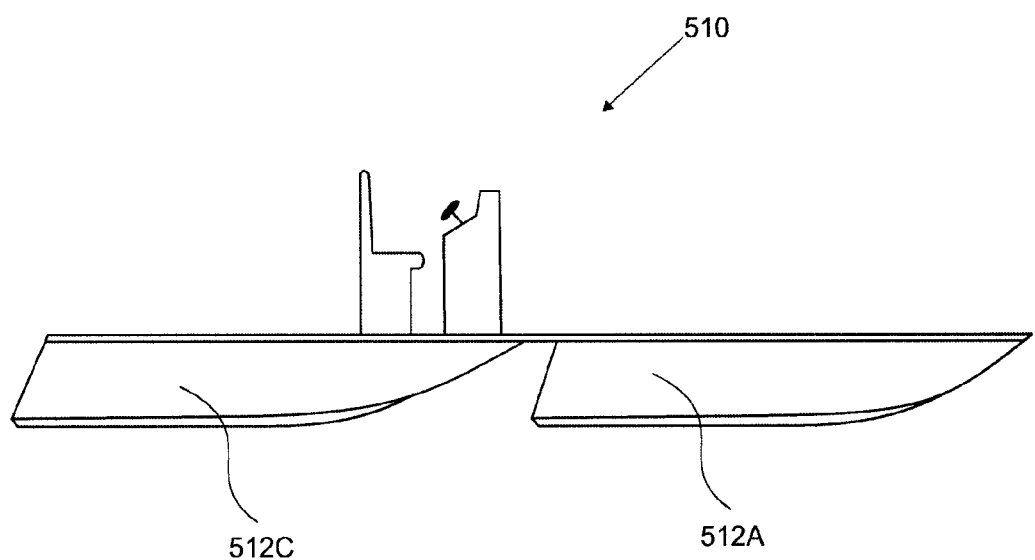

The implementation of the foil structures 100, 200 according to the preferred embodiments of the invention is not limited to applications where the floating device forms the hull of a mono-hull watercraft. The floating device forms, for example, at least a hull of a multi-hull watercraft such as: hulls 502A, 502B of catamaran 501; or hulls 504A, 504B, 504C of trimaran 503, as illustrated in FIGS. 4a and 4b, respectively. Alternatively, the floating device forms a main hull of a multi-hull watercraft such as, for example, a catamaran-type watercraft 505 with main hull 506 and outrigger 507, as illustrated in FIG. 4c. In another implementation the floating device forms at least a pontoon of a pontoon watercraft with, for example, two pontoons forming a catamaran-type watercraft or, as illustrated in FIGS. 4d and 4e, forming each of a plurality of shorter pontoons of pontoon boat 510 with pontoons 512C and 512D being placed behind pontoons 512A and 512B, respectively.

Figure 4F:
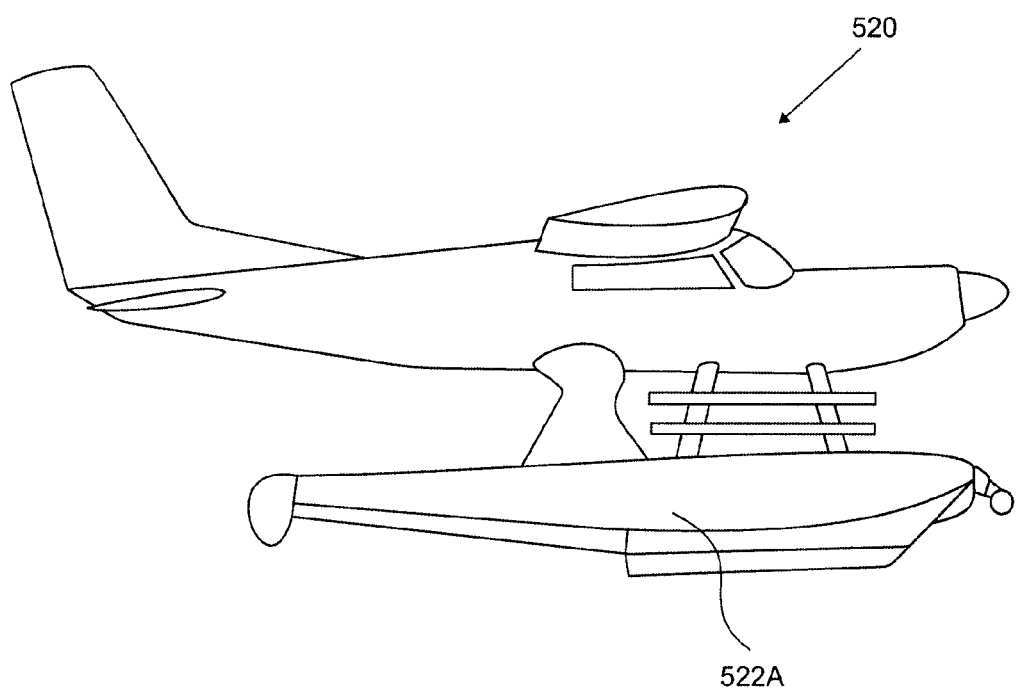
FIGS. 4f and 4g are simplified block diagrams illustrating a side view and a bottom view, respectively, of a float plane incorporating an embodiment of the invention.
Figure 4G:
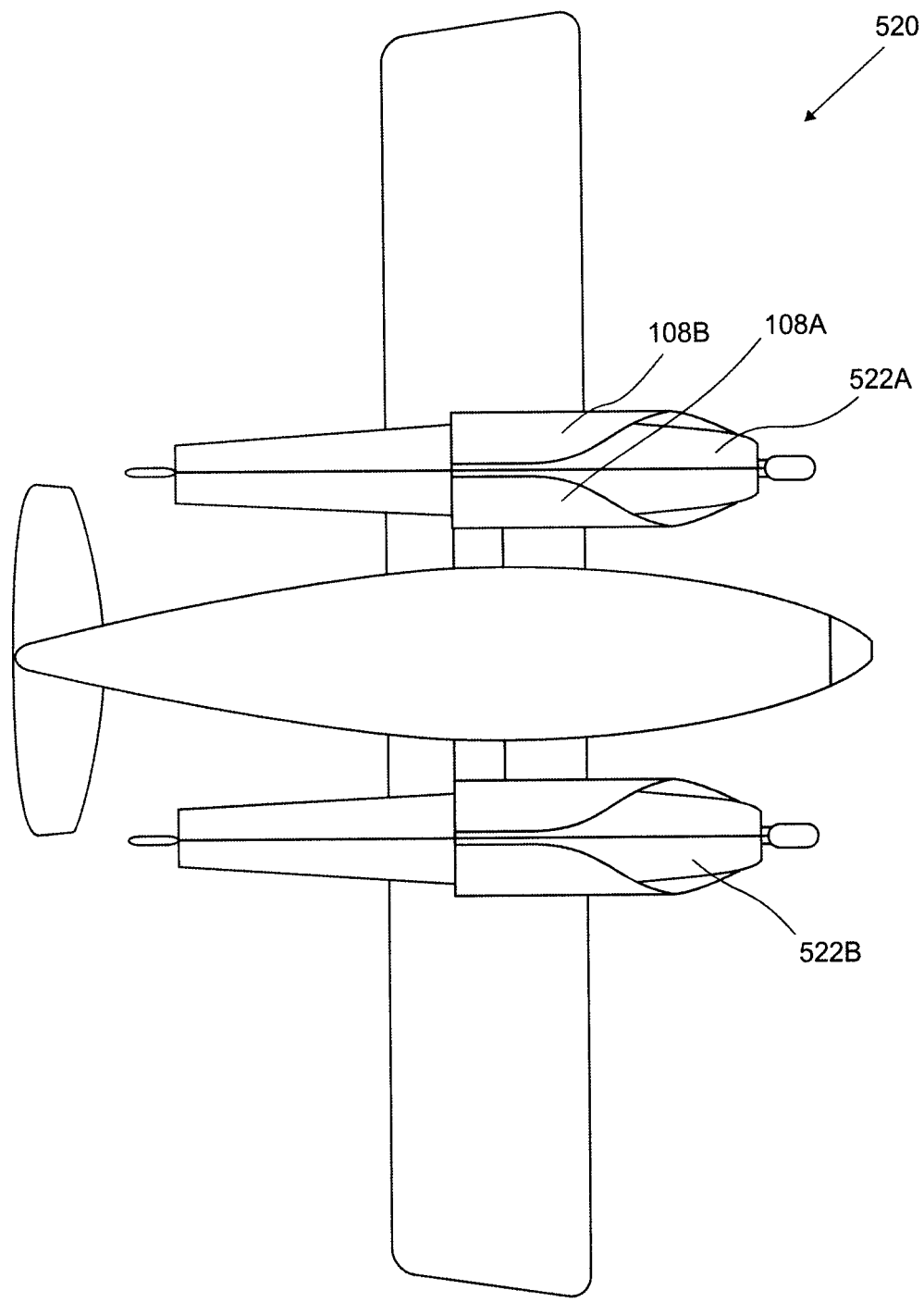
Figure 4H:
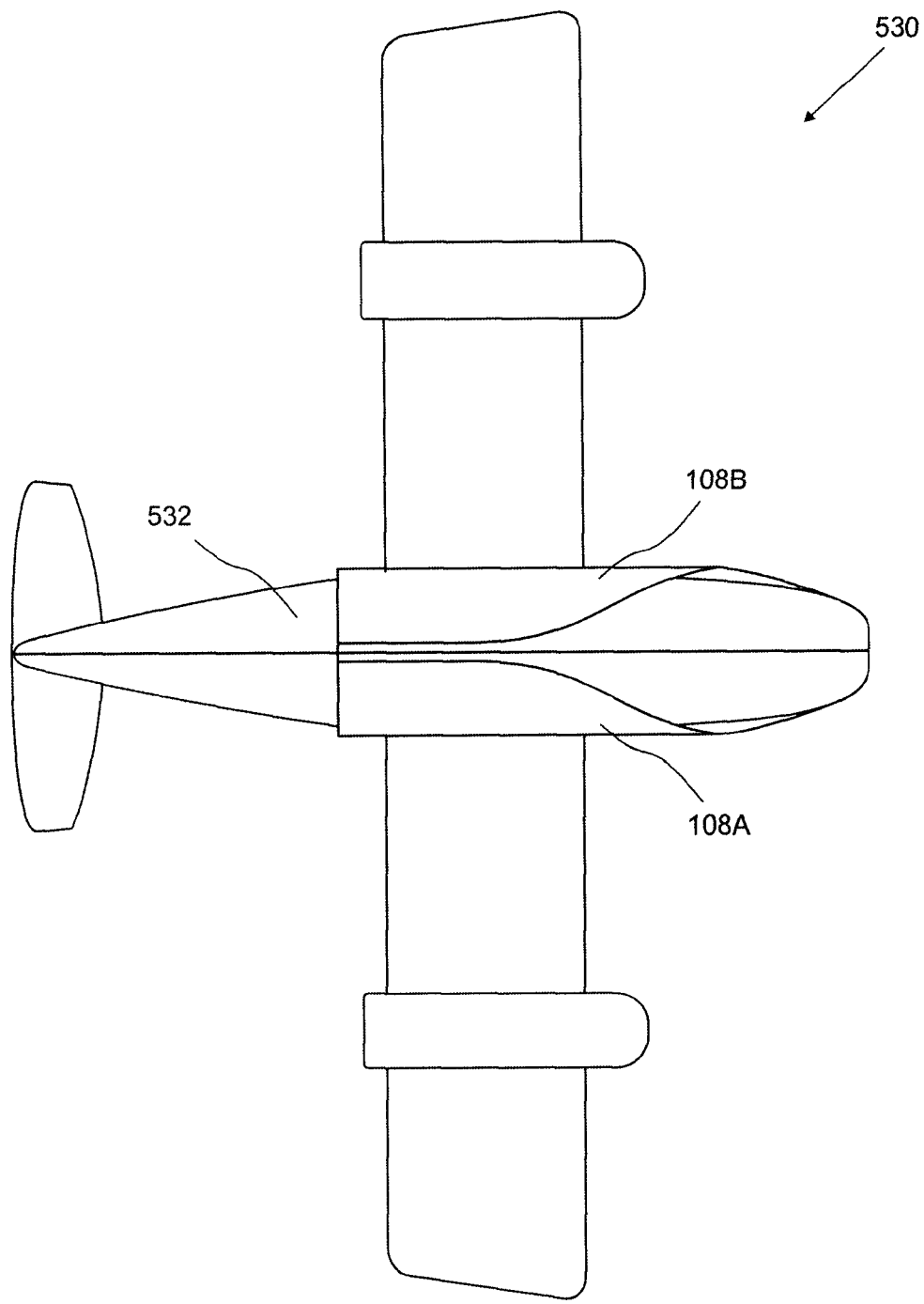
FIG. 4h is a simplified block diagram illustrating a bottom view of a flying boat incorporating an embodiment of the invention.

Further alternatively, the floating device is implemented for use with aircraft such as, for example, floatplanes and flying boats. Referring to FIGS. 4f and 4g, a side view and a bottom view, respectively, of a float plane 520 with the floating device forming the pontoons 522A and 522B are illustrated. Here, the use of the foil structure improves: the landing capability of the float plane by reducing skipping and absorbing the impact when sinking into the water; and the take off capability by enabling handling of rough water during take off and by aiding in "unsticking" the floats in calm water. Referring to FIG. 4h, a bottom view of a flying boat 530 with the floating device forming the fuselage 532 is illustrated. Similar to the float plane, the use of the foil structure improves the landing capability as well as the take off capability. Furthermore, when the flying boat is used as a water bomber the foil structure improves the capability of the plane to take on water by skimming a water surface having, for example, water intake openings disposed in the bottom surface of the foils 108A, 108B, as illustrated in FIGS. 3d and 3e herein above.

Further implementations of the floating device comprise surfboards and scale model boats such as, for example, radio-controlled model boats. Yet further, the operation of the floating device may be envisioned in a video game.

Figure 5A:
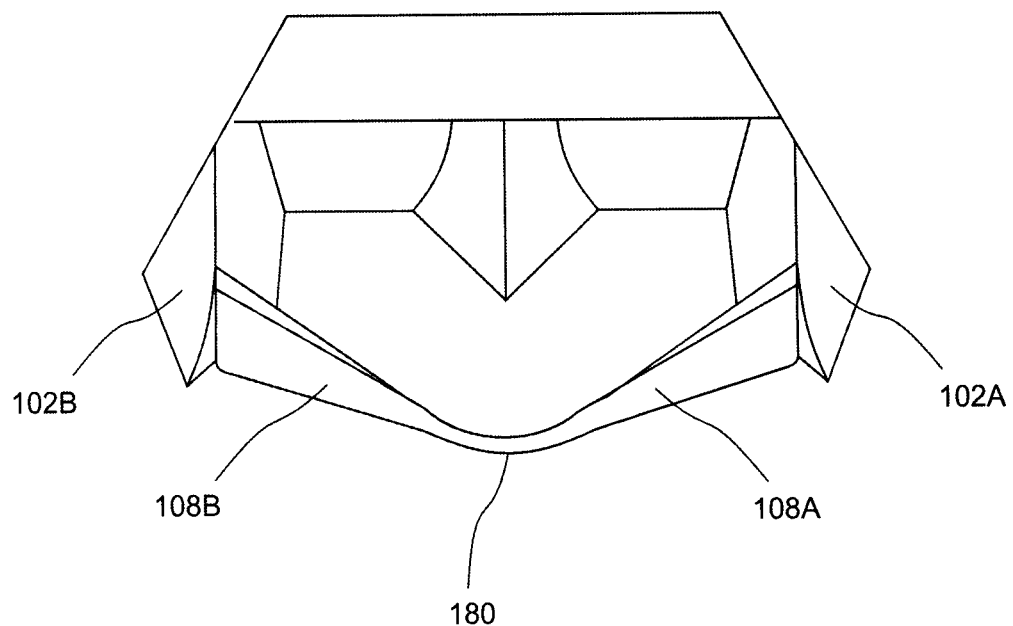
FIGS. 5a and 5b are simplified block diagrams illustrating a front view of a foil structure with different connecting structures according to a preferred embodiment of the invention.
Figure 5B:
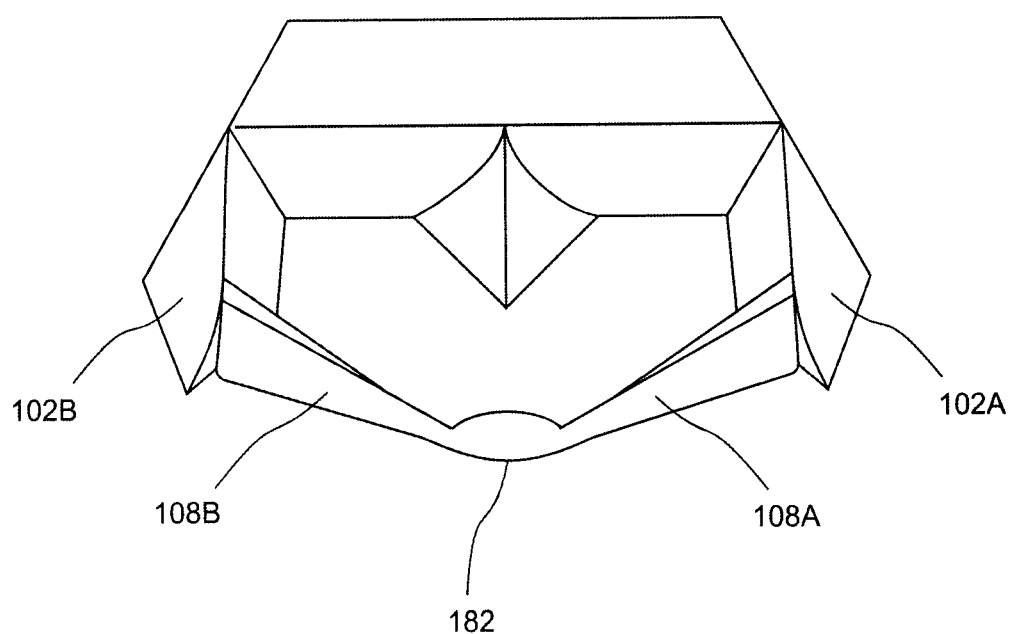
Figure 5C:
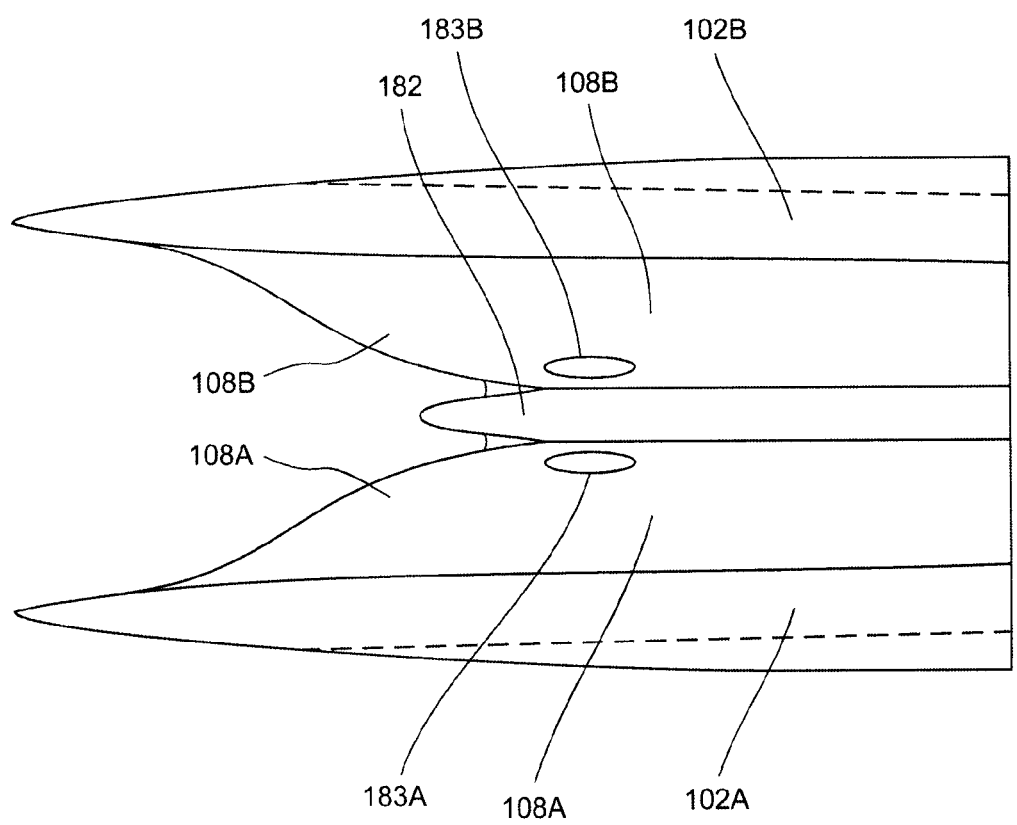
FIG. 5c is a simplified block diagram illustrating a top view of a foil structure with the connecting structure illustrated in FIG. 6b according to a preferred embodiment of the invention.

Optionally, the foil structure 100 comprises a connecting structure interposed between the left hand side foil 108A and the right hand side foil 108B and connected thereto, as illustrated in FIGS. 5a to 5c. Preferably, a front end of the connecting structure is placed a predetermined distance to the location of the intersection of the leading edge 110A, 110B with the respective hull section 102A, 102B and a rear end of the connecting structure is placed in proximity to the stern portion of the hull section. The connecting structure is formed, for example, as a blending element 180 for smoothly connecting respective top and bottom surfaces of the left hand side foil 108A and the right hand side foil 108B, as illustrated in FIG. 5a. Alternatively, the connecting structure comprises an elongated body 182—having, for example, a torpedo-like shape—disposed between the left hand side foil 108A and the right hand side foil 108B, as illustrated in FIGS. 5b and 5c. Optionally, one or more openings 183A, 183B are disposed in the foils 108A, 108B, as illustrated in FIG. 5c, or in connecting structure. Preferably, the openings are disposed in the front portion of the foils or connecting structure for removing water from the top surface of the foils 108A, 108B when encountering waves.

Figure 5D:
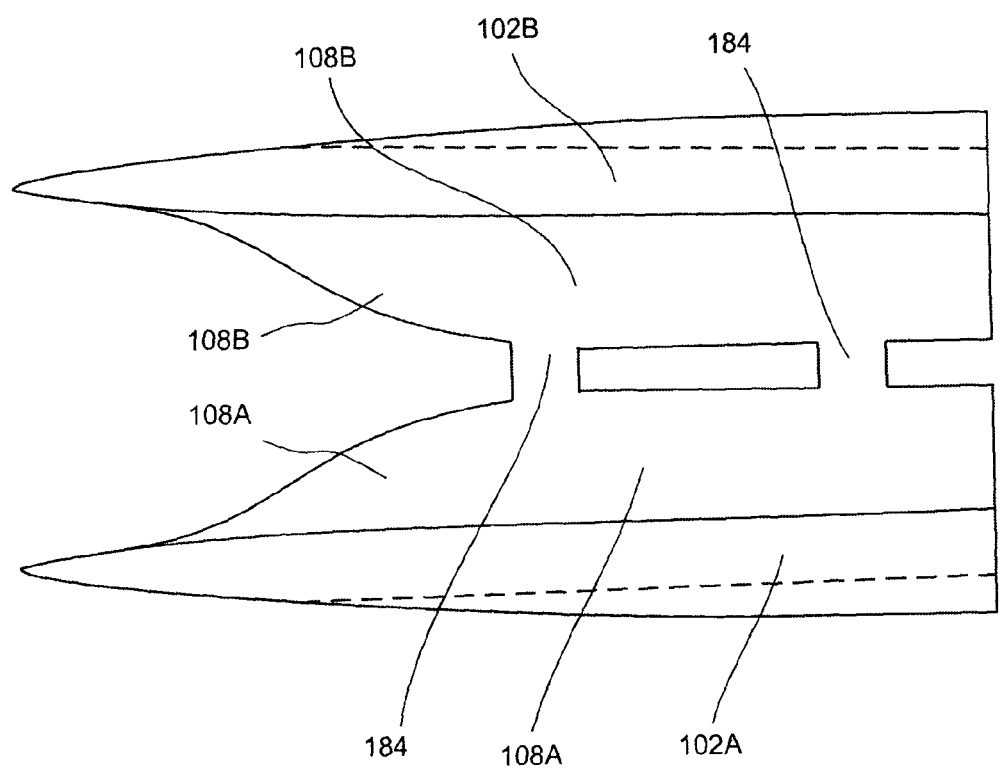
FIG. 5d is a simplified block diagram illustrating a top view of a foil structure connecting elements according to a preferred embodiment of the invention.

Alternatively, one or more connecting elements 184 are disposed between the foils 108A, 108B along the longitudinal axis 101, as illustrated in FIG. 5d, to add rigidity to the foil structure 100.

Figure 6A:
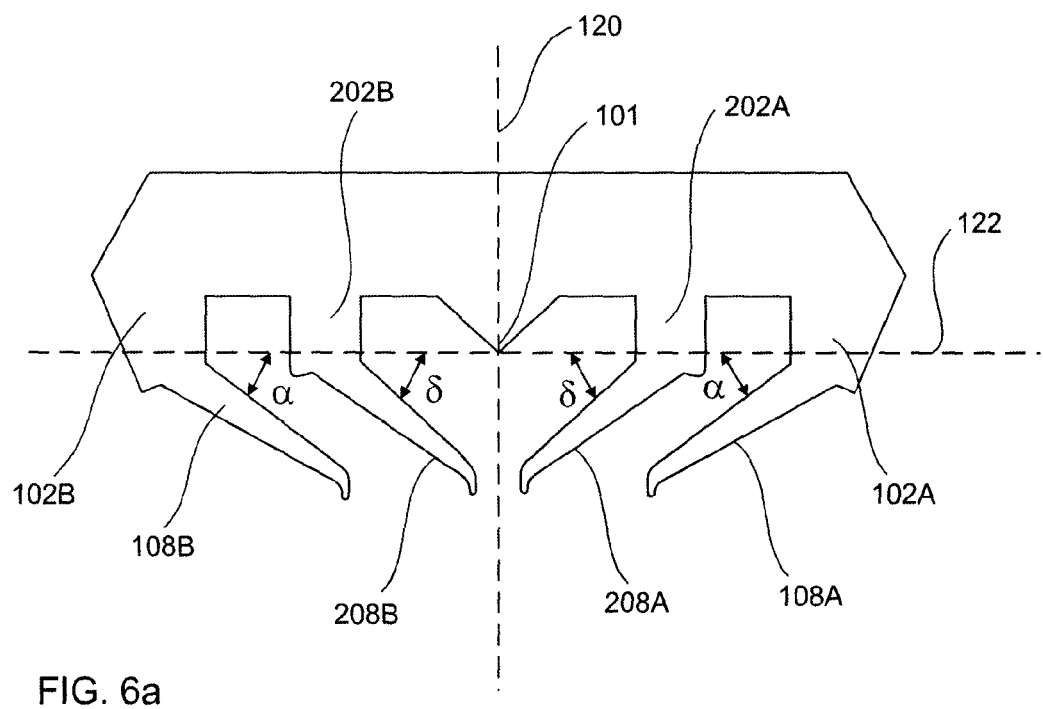
FIGS. 6a to 6c are simplified block diagrams illustrating front views of foil structures with more than two foils according to an embodiment of the invention.

Optionally, the foil structures 100, 200 comprise two or more hull sections with foils protruding therefrom to increase lift and/or to widen the deck area of large watercraft. Referring to FIG. 6a, the foil structure 100 comprises a second elongated left hand side hull section 202A and a second elongated right hand side hull section 202B. The second left hand side hull section 202A and the second right hand side hull section 202B are placed at a predetermined distance to the longitudinal axis 101 of the watercraft and oriented substantially parallel thereto. A second left hand side foil 208A and a second right hand side foil 208B protrude from the second left hand side hull section 202A and the second right hand side hull section 202B, respectively, towards the vertical plane 120 through the longitudinal axis 101 and are oriented at an acute angle $\delta$ to the horizontal plane 122. A leading edge of each second foil 208A, 208B intersects the respective hull section 202A, 202B in proximity to a bow portion thereof. Each second foil 208A, 208B extends along the respective hull section 202A, 202B and terminates in proximity to a stern portion thereof. Depending on the application, the foils 108A, 108B and the second foils 208A, 208B are of same size and shape and are oriented at a same angle to the horizontal plane 122 or, alternatively, the second foils 208A, 208B are of different size and shape and are oriented at a different angle to the horizontal plane 122.

Figure 6B:
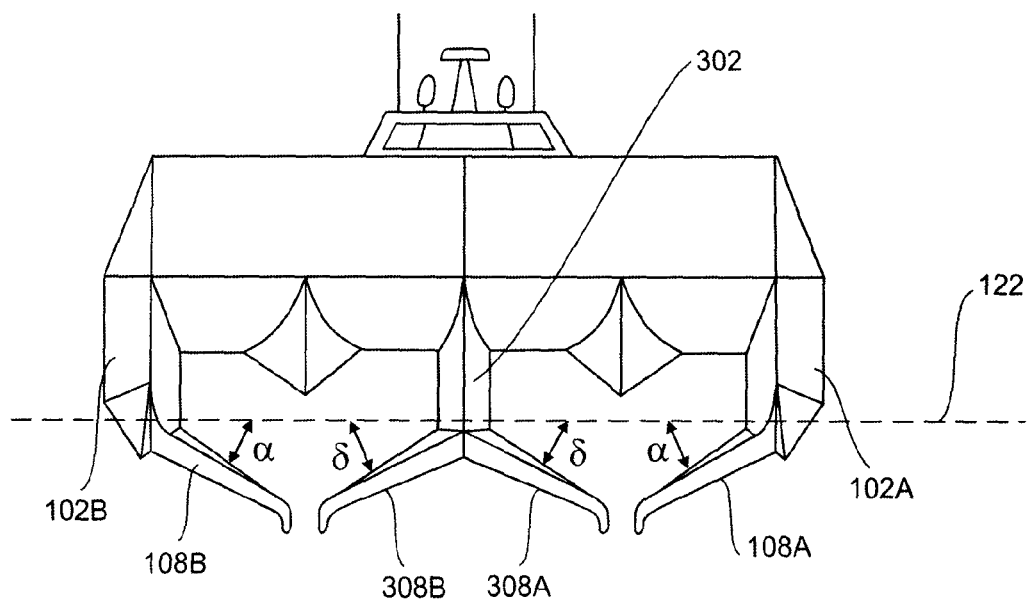

Referring to FIG. 6b, the foil structures 100, 200 comprise an elongated center hull section 302 placed between the left hand side hull section 102A and the right hand side hull section 102B and oriented substantially parallel thereto. A second left hand side foil 308A and a second right hand side foil 308B protrude from the center hull section 302 and are oriented at an acute angle $\delta$ to the horizontal plane 122, a leading edge of each second foil 308A, 308B intersects the center hull section 302 in proximity to a bow portion thereof. Each second foil 308A, 308B extends along the center hull section 302 and terminates in proximity to a stern portion thereof. Depending on the application, the foils 108A, 108B and the second foils 308A, 308B are of same size and shape and are oriented at a same angle to the horizontal plane 122 or, alternatively, the second foils 308A, 308B are of different size and shape and are oriented at a different angle to the horizontal plane 122.

Further optionally, more than one center hull section 302 is disposed between the left hand side hull section 102A and the right hand side hull section 102B. Preferably, the bow of the center hull sections 302 are then placed a predetermined distance in front of, or back from the bow of the hull sections 102A, 102B in order to provide a substantially equal distribution of the lift provided by the foil structure.

Figure 6C:
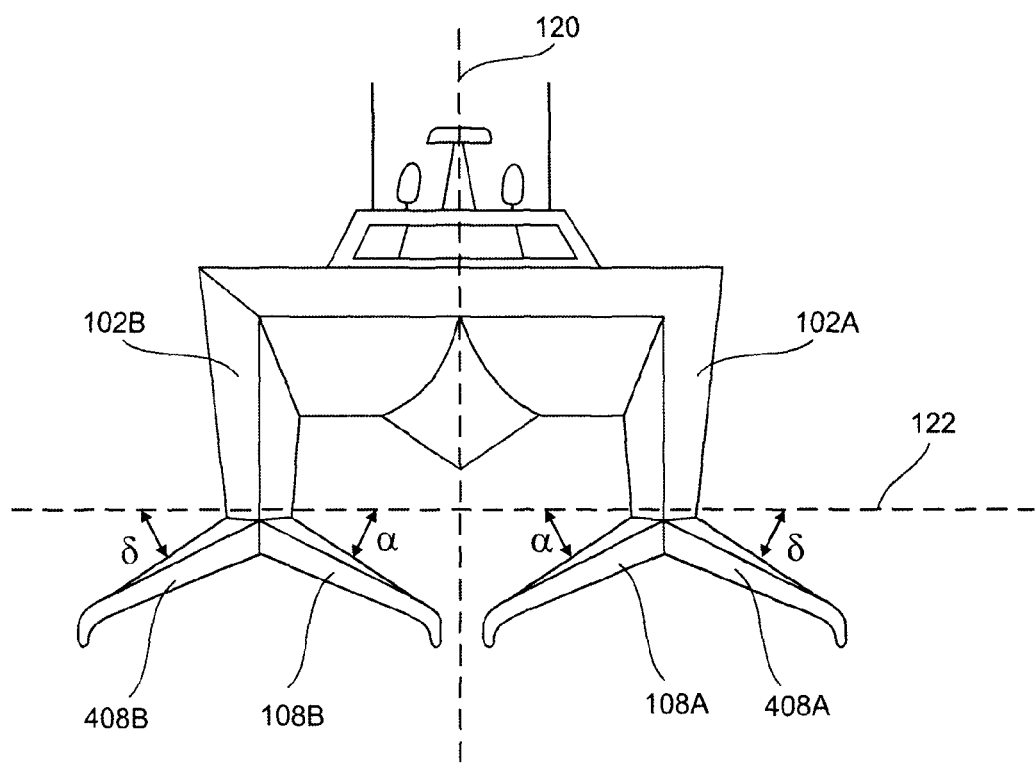
Figure 6D:
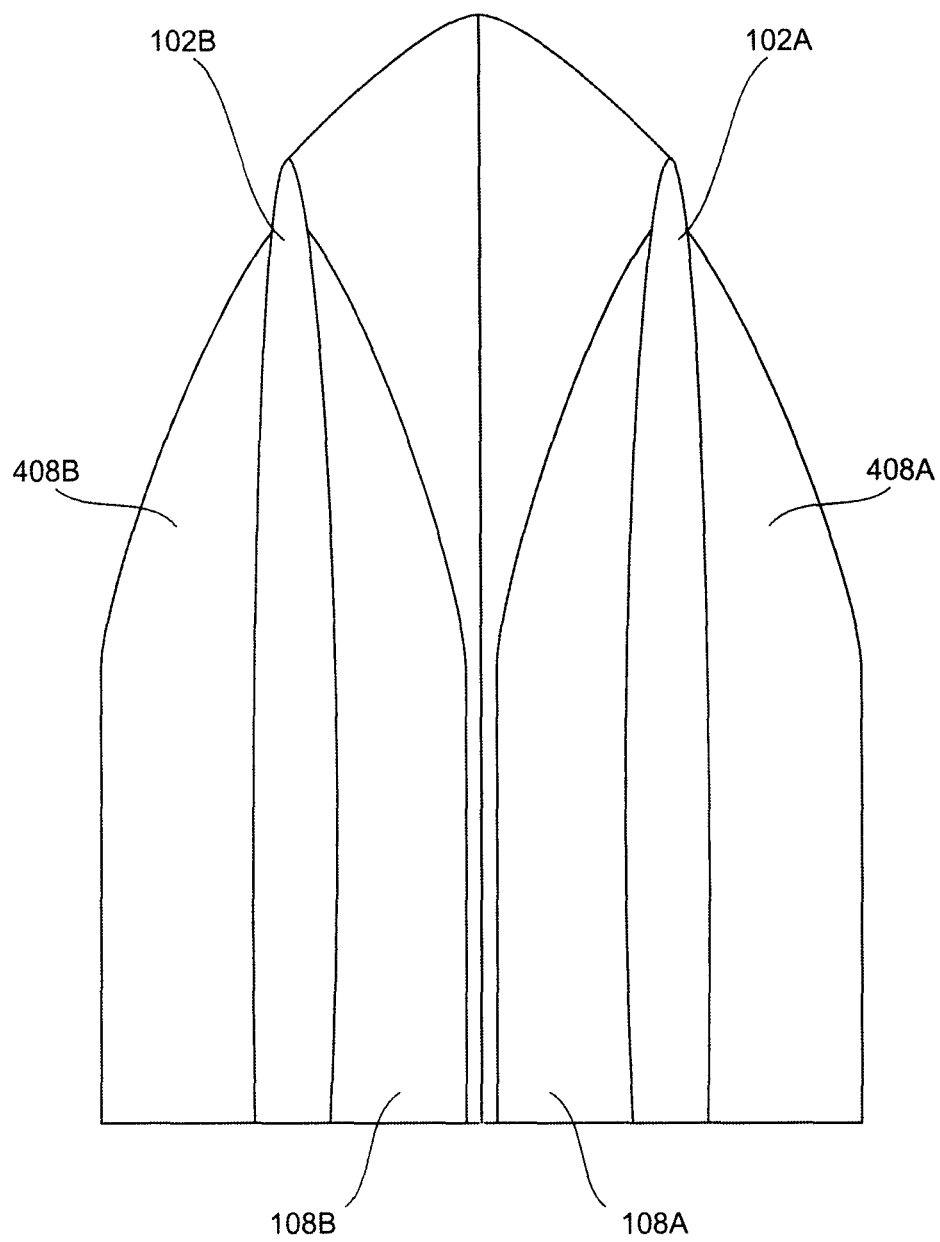
FIG. 6d is a simplified block diagram illustrating a bottom view of the foil structure illustrated in FIG. 6c.

Referring to FIGS. 6c and 6d, the foil structures 100, 200 comprise an outside left hand side foil 408A and an outside right hand side foil 408B protruding from the left hand side hull section 102A and the right hand side hull section 102B, respectively, away from the vertical plane 120 through the longitudinal axis. The outside left hand side foil 408A and an outside right hand side foil 408B are at an acute outside angle $\delta$ to the horizontal plane 122. Use of the outside foils 408A, 408B provides substantially increased lift for a same sized vessel. Depending on the application, the foils 108A, 108B and the outside foils 408A, 408B are of same size and shape and are oriented at a same angle to the horizontal plane 122 or, alternatively, the second foils 308A, 308B are of different size and shape and are oriented at a different angle to the horizontal plane 122.

Figure 6E:
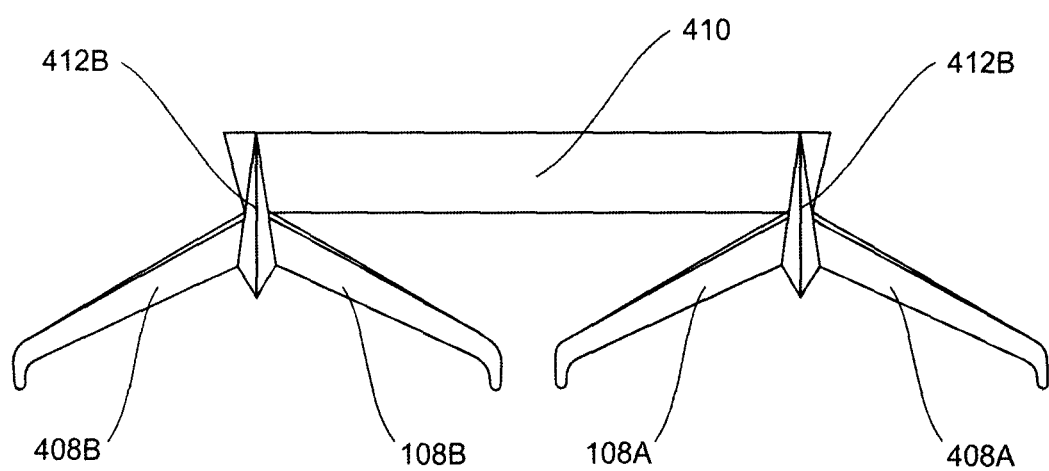
FIG. 6e is a simplified block diagram illustrating a front view of a foil structure with foils capable of providing at least a substantial portion of the buoyancy according to an to embodiment of the invention.

Optionally, the foils are of sufficient size to be capable of providing at least a substantial portion of the buoyancy needed for floating the floating device when at rest. For example, the foils 108A, 108B, 408A, and 408B are connected to the deck structure 410 via connecting elements 412A, 412B such that most of the buoyancy is provided by the foils, as illustrated in FIG. 6e. Of course, depending on the size of the vessel this feature is implementable with the various foil structures described herein above.

Figure 7A:
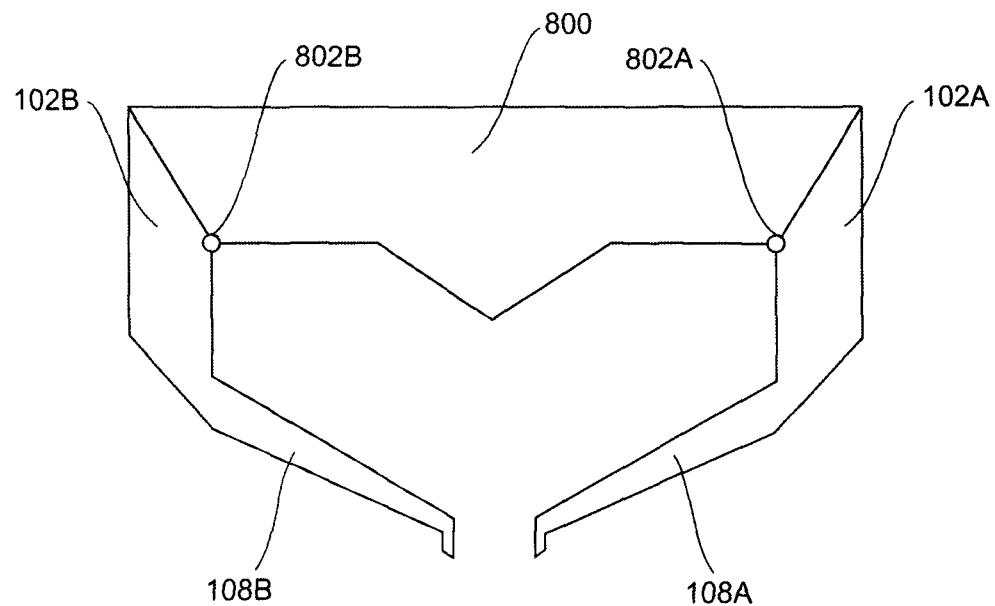
FIGS. 7a to 7f are simplified block diagrams illustrating front views of foil structures with pivotally movable foils according to an embodiment of the invention.
Figure 7B:
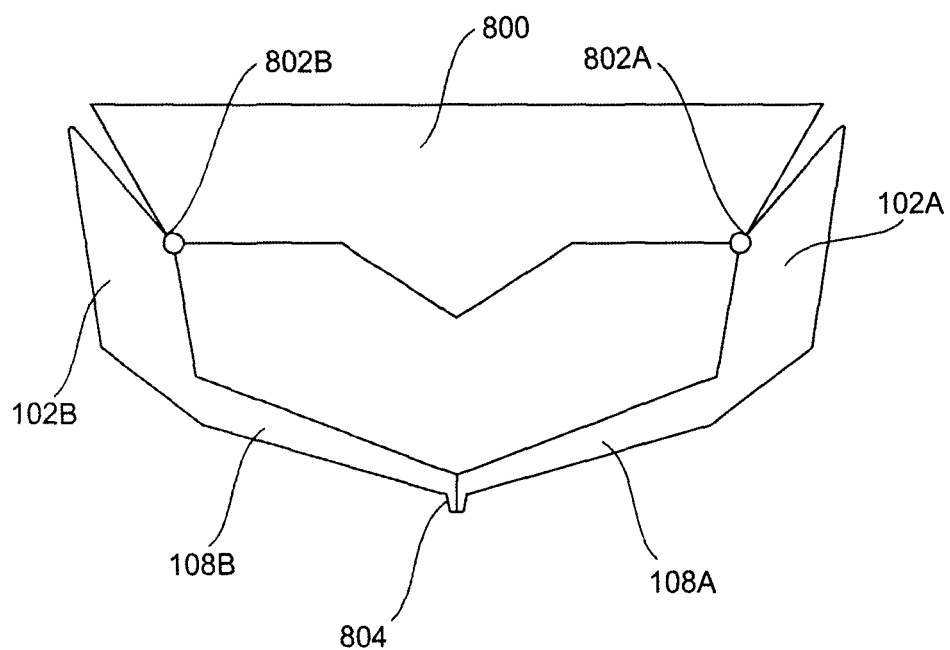

Further optionally, the foil structures 100, 200 comprise a pivot for pivotally moving the foils. Referring to FIGS. 7a and 7b, the left hand side hull section 102A and the right hand side hull section 102B are pivotally movable mounted to the remaining hull 800 via pivots 802A and 802B, respectively, enabling pivotal movement of the foils 108A, 108B around the pivots between a first position and a second position as illustrated in FIGS. 7a and 7b, respectively. The pivotal movement enables, for example, continuous adjustment of the foils—between the first position illustrated in FIG. 7a and the second position illustrated in FIG. 7b with the foils being in contact with each other at 804 forming a single continuous foil—for various sea states and speeds.

Figure 7C:
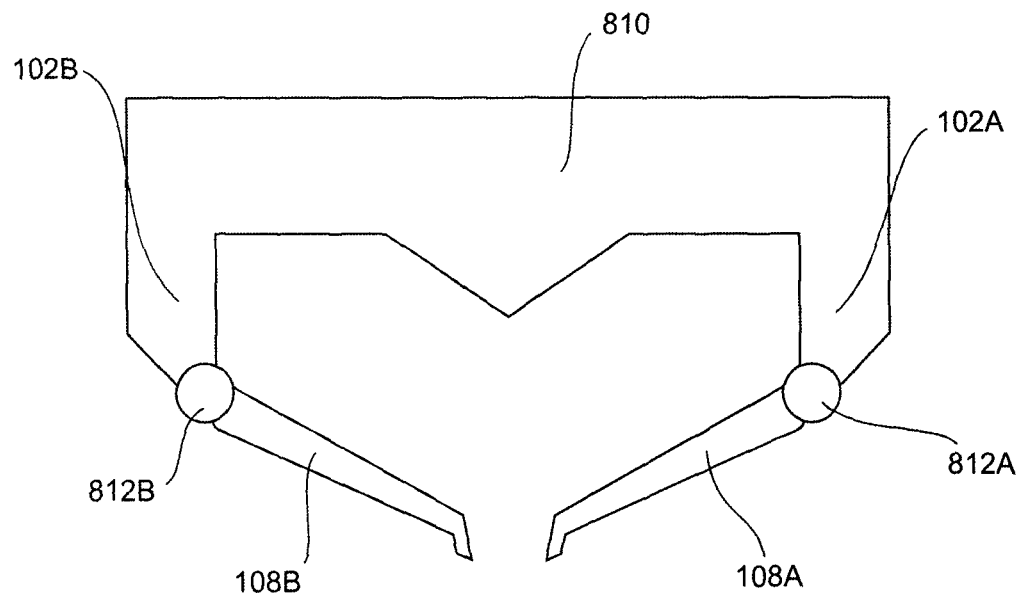
Figure 7D:
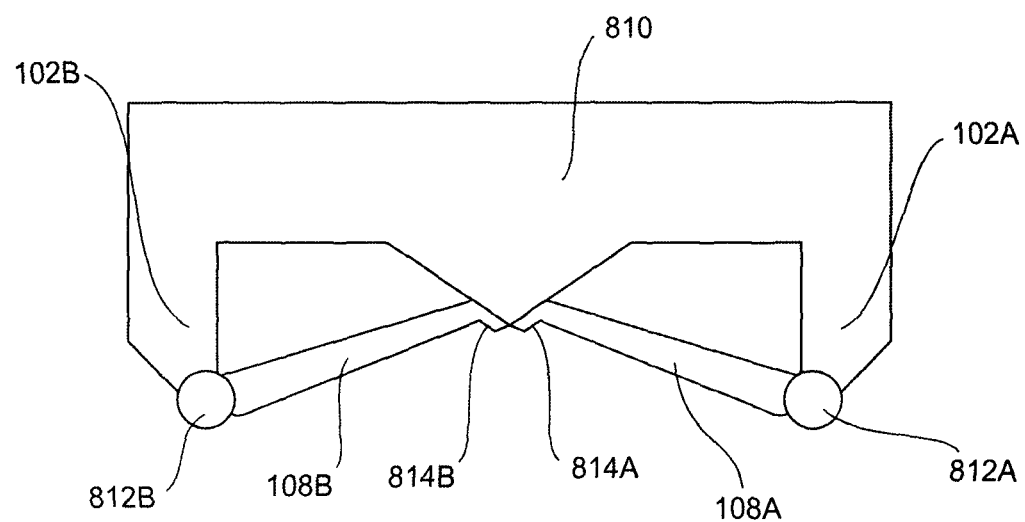

Referring to FIGS. 7c and 7d, the left hand side foil 108A and the right hand side foil 108B are pivotally movable mounted to the left hand side hull section 102A and the right hand side hull section 102B of hull 810 via pivots 812A and 812B, respectively, enabling pivotal movement of the foils 108A, 108B around the pivots between a first position and a second position as illustrated in FIGS. 7c and 7d, respectively. The pivotal movement enables, for example, continuous adjustment of the foils—between the first position illustrated in FIG. 7a and the second position illustrated in FIG. 7b with the foils being in contact with the bottom of the hull 810 at 814A and 814B—for various sea states and speeds. Furthermore, operation of a vessel in very shallow waters is enabled by moving the foils in the second position.

Figure 7E:
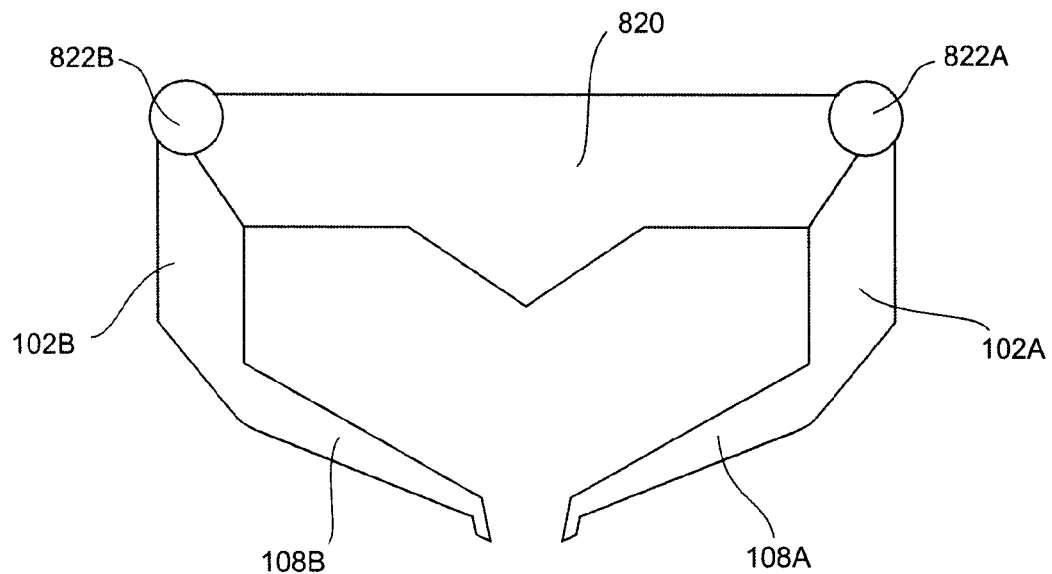
Figure 7F:
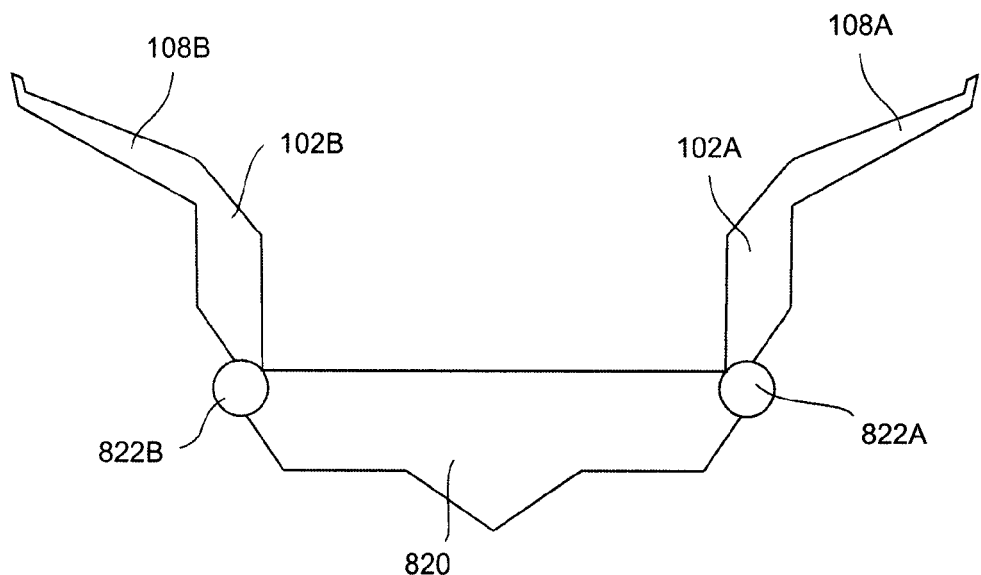

Referring to FIGS. 7e and 7f, the left hand side hull section 102A and the right hand side hull section 102B are pivotally movable mounted to the remaining hull 820 via pivots 822A and 822B, respectively, enabling pivotal movement of the foils 108A, 108B around the pivots between a first position and a second position as illustrated in FIGS. 7e and 7f, respectively. The pivotal movement enables, for example, movement of the foils outwardly and upwardly from an operating position, illustrated in FIG. 7e, into a non-wetted resting position, illustrated in FIG. 7f, enabling, for example, operation of a vessel in very shallow waters.

The pivotal movement is implemented using conventional technology such as, for example, suitable hinge mechanisms and hydraulic actuators.

Figure 8A:
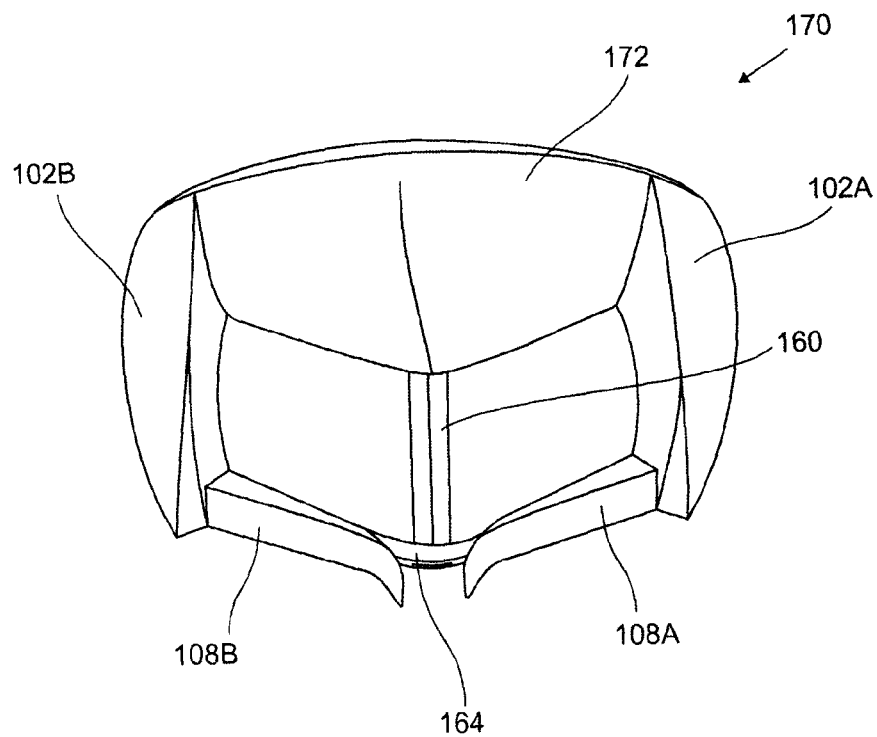
FIGS. 8a and 8b are simplified block diagrams illustrating a front view and a side view, respectively, of a retrofit foil structure according to a preferred embodiment of the invention.
Figure 8B:
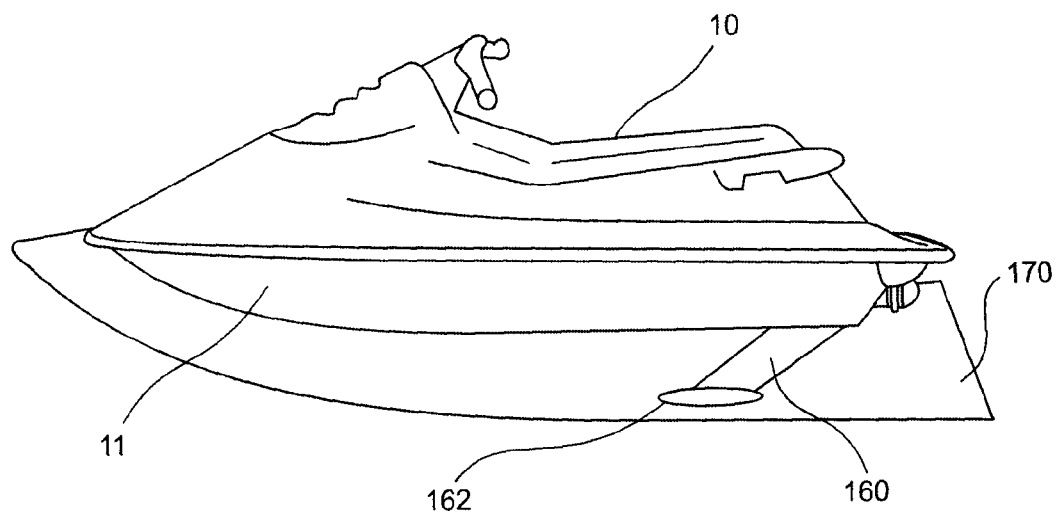
Figure 8C:
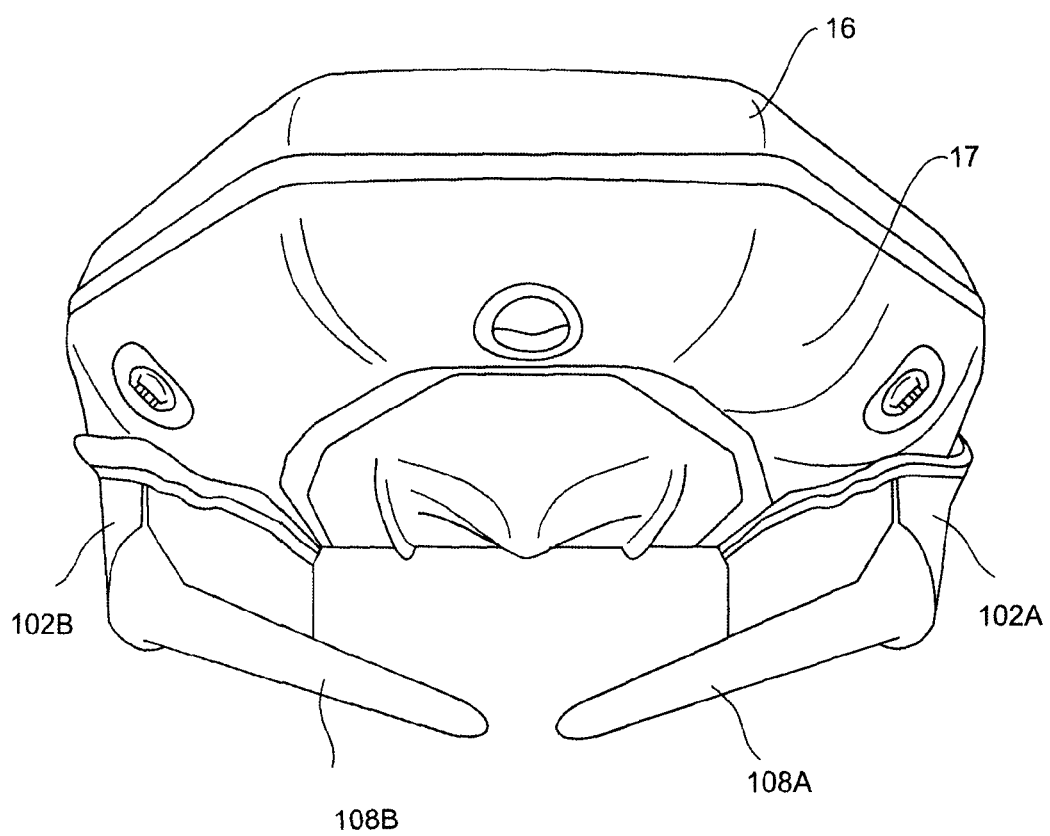
FIG. 8c is a simplified block diagram illustrating a front view of another retrofit foil structure according to a preferred embodiment of the invention; and, FIGS. 9a and 9b are simplified block diagrams illustrating a side view and a rear view, respectively, of an inflatable foil structure according to a preferred embodiment of the invention.

Further optionally, the foil structures 100, 200 are provided as a foil retrofit 170 for being mounted to the hull 11 of an existing watercraft 10 such as, for example, a personal water craft or Sea-Doo®, as illustrated in FIGS. 8a and 8b. The foil retrofit 170 comprises a holding element 172 for being mated with a respective portion of the hull 11 of the watercraft 10 and a mounting element for removably mounting the foil retrofit 170 to the watercraft 10 in a secure fashion. Preferably, the holding element 172 comprises a "shoe" like structure 172 for accommodating a substantial portion of the hull 11 of the watercraft therein. The holding element 172 is then removable mounted to the hull 11 of the watercraft using, for example, straps, clamps or a screw mechanism. For water craft comprising a water jet drive an intake opening 162 is disposed between the foils or, alternatively, in the bottom surface of the foils as described herein above. A top end of the intake conduit 160 of the foil retrofit 170 is shaped for mating with the existing water intake of the jet drive of the watercraft 10. Alternatively, the hull sections 102A, 102B with the protruding foils 108A, 108B are mounted individually in a conventional manner to the hull 17 of a watercraft 16, as illustrated in FIG. 8c.

Figure 9A:
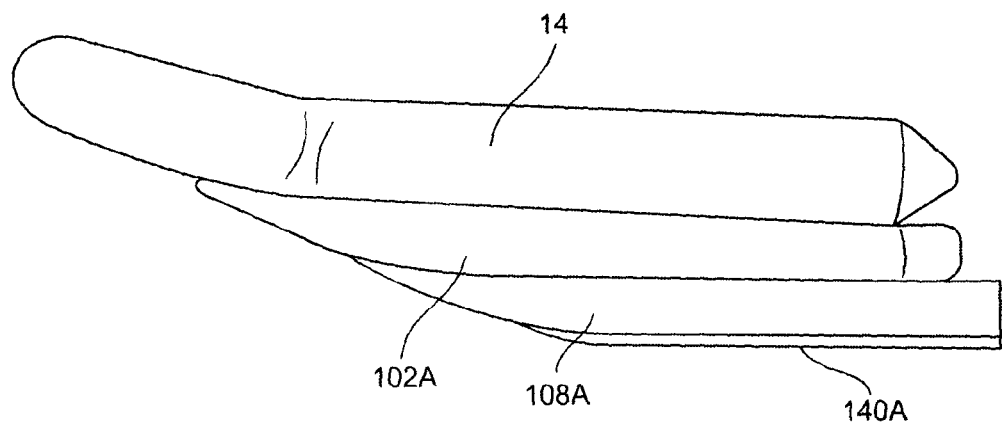
Figure 9B:
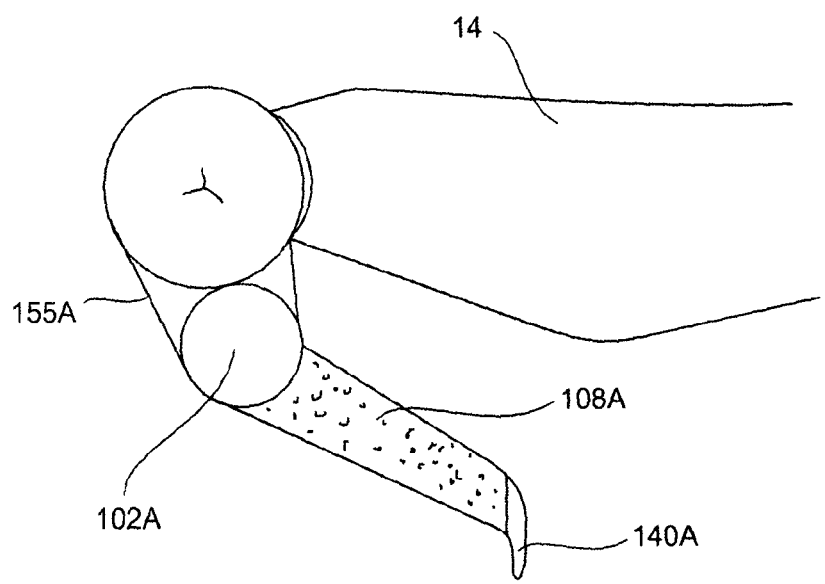

Further optionally, the foil structures 100, 200 are provided as inflatable structures, as illustrated in FIGS. 9a and 9b. For simplicity, only the left hand side of the inflatable structure is illustrated. The hull section 102A is provided as an inflatable tube narrowing towards the bow. The foil 108A is provided as an inflatable "drop stitch" structure to ensure rigidity thereof. The fin 140A is provided as an inflatable "drop stitch" structure or as a rigid structure made of, for example, wood or a composite material. The hull section 102A is mounted to an existing hull 14 using, for example, a suitable fabric material 155A such as the fabric material used for the existing hull 14.

The foil structures 100, 200 are designed and manufactured using standard marine technology and standard materials such as composite materials, aluminum, or various metal alloys depending on the size and use of the watercraft.

The present invention has been described herein with regard to preferred embodiments. However, it will be obvious to persons skilled in the art that a number of variations and modifications can be made without departing from the scope of the invention as described herein.

What is claimed is:

1. A foil structure for providing buoyancy and lift to a floating device comprising:
an elongated left hand side floating device section and an elongated right hand side floating device section, the left hand side floating device section and the right hand side floating device section being placed at a predetermined distance to a longitudinal axis of the floating device and oriented substantially parallel thereto; and,
a left hand side foil and a right hand side foil protruding from the left hand side floating device section and the right hand side floating device section, respectively, towards a vertical plane through the longitudinal axis and being oriented at an acute angle to a horizontal plane, a leading edge of each foil intersecting the respective floating device section in proximity to a bow portion thereof, each foil extending along the respective floating device section and terminating in proximity to a stern portion thereof, each foil having a top surface with a front portion thereof being angled downward towards the leading edge, the angled front portion being determined such that wave penetration is assisted and instabilities due to buoyancy change are substantially dampened.

2. A foil structure as defined in claim 1 wherein the floating device forms one of:
a hull of a mono-hull watercraft;
at least a hull of a multi-hull watercraft;
a main hull of a multi-hull watercraft;
at least a pontoon of a pontoon watercraft;
a pontoon of a floatplane; and,
a fuselage of a flying boat.

3. A foil structure as defined in claim 1 comprising:
an outside left hand side foil and an outside right hand side foil protruding from the left hand side floating device section and the right hand side floating device section, respectively, away from the vertical plane through the longitudinal axis and being oriented at an acute outside angle to the horizontal plane, a leading edge of each foil intersecting the respective floating device section in proximity to the bow portion thereof, each foil extending along the respective floating device section and terminating in proximity to the stern portion thereof.

4. A foil structure as defined in claim 1 wherein the left hand side foil and the right hand side foil are of sufficient size for providing at least a substantial portion of buoyancy for floating the floating device when at rest.

5. A foil structure as defined in claim 1 comprising:
a second elongated left hand side floating device section and a second elongated right hand side floating device section, the second left hand side floating device section and the second right hand side floating device section being placed at a predetermined distance to the longitudinal axis of the floating device and oriented substantially parallel thereto; and,
a second left hand side foil and a second right hand side foil protruding from the second left hand side floating device section and the second right hand side floating device section, respectively, towards the vertical plane through the longitudinal axis and being oriented at an acute second angle to the horizontal plane, a leading edge of each second foil intersecting the respective floating device section in proximity to a bow portion thereof, each second foil extending along the respective floating device section and terminating in proximity to a stern portion thereof.

6. A foil structure as defined in claim 1 comprising:
an elongated center floating device section placed between the left hand side floating device section and the right hand side floating device section and oriented substantially parallel thereto; and,
a second left hand side foil and a second right hand side foil protruding from the center hull section and being oriented at an acute second angle to the horizontal plane, a leading edge of each second foil intersecting the center floating device section in proximity to a bow portion thereof, each second foil extending along the center floating device section and terminating in proximity to a stern portion thereof.

7. A foil structure as defined in claim 1 wherein an extension of the angled surface portion from the leading edge increases with decreasing distance to the respective floating device section.

8. A foil structure as defined in claim 1 wherein each foil has a bottom surface with a front portion thereof being angled upward therefrom towards the leading edge.

9. A foil structure as defined in claim 8 wherein an extension of the angled surface portion from the leading edge increases with decreasing distance to the respective floating device section.

10. A foil structure as defined in claim 1 wherein the floating device sections comprise a substantially narrow bow portion.

11. A foil structure as defined in claim 1 comprising a water intake mechanism.

12. A foil structure as defined in claim 11 wherein the water intake mechanism comprises an intake conduit having an intake opening disposed between the left hand side foil and the right hand side foil, an end portion of the intake conduit being connected to the left hand side foil and the right hand side foil.

13. A foil structure as defined in claim 12 wherein the intake opening is disposed in an intake foil structure with the intake foil structure being placed between the left hand side foil and the right hand side foil and connected thereto.

14. A foil structure as defined in claim 11 wherein the water intake mechanism comprises an intake conduit disposed in at least one of the left hand side foil and the right hand side foil and having an intake opening disposed in a bottom surface of the foil.

15. A foil structure as defined in claim 1 comprising a connecting structure interposed between the left hand side foil and the right hand side foil and connected thereto.

16. A foil structure as defined in claim 15 wherein a front end of the connecting structure is placed a predetermined distance to the location of the intersection of the leading edge with the floating device section and wherein a rear end of the connecting structure is placed in proximity to the stern portion of the floating device section.

17. A foil structure as defined in claim 1 wherein the foils are inflatable structures.

18. A foil structure as defined in claim 1 wherein each of the foils is pivotally movable around an axis oriented substantially parallel to the longitudinal axis.

19. A foil structure as defined in claim 18 wherein a portion of each of the floating device sections is pivotally movable.

20. A foil structure for providing buoyancy and lift to a floating device comprising:
an elongated left hand side floating device section and an elongated right hand side floating device section, the left hand side floating device section and the right hand side floating device section being placed at a predetermined distance to a longitudinal axis of the floating device and oriented substantially parallel thereto;
a left hand side foil and a right hand side foil protruding from the left hand side floating device section and the right hand side floating device section, respectively, towards a vertical plane through the longitudinal axis and being oriented at an acute angle to a horizontal plane, a leading edge of each foil intersecting the respective floating device section in proximity to a bow portion thereof and changing to a side edge extending along the respective floating device section and terminating in proximity to a stern portion thereof; and,
a downward fin disposed along at least a substantial portion of the side edge of the left hand side foil and the right hand side foil, the downward fin being oriented substantially downward.

21. A foil structure as defined in claim 20 wherein the floating device forms one of:
a hull of a mono-hull watercraft;
at least a hull of a multi-hull watercraft;
a main hull of a multi-hull watercraft;
at least a pontoon of a pontoon watercraft;
a pontoon of a floatplane; and,
a fuselage of a flying boat.

22. A foil structure as defined in claim 20 comprising an upward fin disposed along at least a substantial portion of the side edge of the left hand side foil and the right hand side foil, the upward fin being oriented substantially upward.

23. A foil structure as defined in claim 20 comprising:
an outside left hand side foil and an outside right hand side foil protruding from the left hand side floating device section and the right hand side floating device section, respectively, away from the vertical plane through the longitudinal axis and being oriented at an acute outside angle to the horizontal plane, a leading edge of each foil intersecting the respective floating device section in proximity to the bow portion thereof, each foil extending along the respective floating device section and terminating in proximity to the stern portion thereof.

24. A foil structure as defined in claim 20 wherein the left hand side foil and the right hand side foil are of sufficient size for providing at least a substantial portion of buoyancy for floating the floating device when at rest.

25. A foil structure as defined in claim 20 comprising:
a second elongated left hand side floating device section and a second elongated right hand side floating device section, the second left hand side floating device section and the second right hand side floating device section being placed at a predetermined distance to the longitudinal axis of the floating device and oriented substantially parallel thereto; and,
a second left hand side foil and a second right hand side foil protruding from the second left hand side floating device section and the second right hand side floating device section, respectively, towards the vertical plane through the longitudinal axis and being oriented at an acute second angle to the horizontal plane, a leading edge of each second foil intersecting the respective floating device section in proximity to a bow portion thereof, each second foil extending along the respective floating device section and terminating in proximity to a stern portion thereof.

26. A foil structure as defined in claim 20 comprising:
an elongated center floating device section placed between the left hand side floating device section and the right hand side floating device section and oriented substantially parallel thereto; and,
a second left hand side foil and a second right hand side foil protruding from the center hull section and being oriented at an acute second angle to the horizontal plane, a leading edge of each second foil intersecting the center floating device section in proximity to a bow portion thereof, each second foil extending along the center floating device section and terminating in proximity to a stern portion thereof.

27. A foil structure as defined in claim 20 wherein the floating device sections comprise a substantially narrow bow portion.

28. A foil structure as defined in claim 20 comprising a water intake mechanism.

29. A foil structure as defined in claim 28 wherein the water intake mechanism comprises an intake conduit having an intake opening disposed between the left hand side foil and the right hand side foil, an end portion of the intake conduit being connected to the left hand side foil and the right hand side foil.

30. A foil structure as defined in claim 29 wherein the intake opening is disposed in an intake foil structure with the intake foil structure being placed between the left hand side foil and the right hand side foil and connected thereto.

31. A foil structure as defined in claim 28 wherein the water intake mechanism comprises an intake conduit disposed in at least one of the left hand side foil and the right hand side foil and having an intake opening disposed in a bottom surface of the foil.

32. A foil structure as defined in claim 20 comprising a connecting structure interposed between the left hand side foil and the right hand side foil and connected thereto.

33. A foil structure as defined in claim 32 wherein a front end of the connecting structure is placed a predetermined distance to the location of the intersection of the leading edge with the floating device section and wherein a rear end of the connecting structure is placed in proximity to the stern portion of the floating device section.

34. A foil structure as defined in claim 20 wherein the foils are inflatable structures.

35. A foil structure as defined in claim 20 wherein each of the foils is pivotally movable around an axis oriented substantially parallel to the longitudinal axis.

36. A foil structure as defined in claim 35 wherein a portion of each of the floating device sections is pivotally movable.

* * * * *